United States Patent
Lee et al.

(10) Patent No.: US 11,528,049 B2
(45) Date of Patent: Dec. 13, 2022

(54) APPARATUS AND METHOD FOR SELF-INTERFERENCE SIGNAL CANCELLATION

(71) Applicants: Samsung Electronics Co., Ltd., Suwon-si (KR); Sungkyunkwan University Research & Business Foundation, Suwon-si (KR)

(72) Inventors: Kwonjong Lee, Suwon-si (KR); Sang-Hyo Kim, Seongnam-si (KR); Hyojin Lee, Suwon-si (KR); Yong-Sung Kil, Anyang-si (KR); Dong Hyun Kong, Seoul (KR)

(73) Assignees: Samsung Electronics Co., Ltd., Suwon-si (KR); Sungkyunkwan University Research & Business Foundation, Suwon-si (KR)

( * ) Notice: Subject to any disclaimer, the term of this patent is extended or adjusted under 35 U.S.C. 154(b) by 0 days.

(21) Appl. No.: 17/073,148

(22) Filed: Oct. 16, 2020

(65) Prior Publication Data
US 2021/0119665 A1   Apr. 22, 2021

(30) Foreign Application Priority Data
Oct. 18, 2019   (KR) .......................... 10-2019-0130269

(51) Int. Cl.
*H04B 1/52*   (2015.01)
*H04B 1/525*   (2015.01)
(Continued)

(52) U.S. Cl.
CPC ............... *H04B 1/525* (2013.01); *G06N 3/02* (2013.01); *H04B 1/123* (2013.01); *H04L 5/14* (2013.01); *H04L 25/0202* (2013.01)

(58) Field of Classification Search
CPC .......... H04B 1/525; H04B 1/123; G06N 3/02; G06N 3/0481; G06N 3/04; G06N 3/063;
(Continued)

(56) References Cited

U.S. PATENT DOCUMENTS

2016/0072590 A1\* 3/2016 Tu .......................... H04B 1/525
                                                                455/63.1
2016/0149691 A1\* 5/2016 Chang ................... H04L 5/1461
                                                                370/276
(Continued)

FOREIGN PATENT DOCUMENTS

KR    10-1971781 B1    4/2019

OTHER PUBLICATIONS

Balatsoukas-Stimming, Alexious, "Non-Linear Digital Self-Interference Cancellation for In-Band Full-Duplex Radios Using Neural Networks," 2018 IEEE 19th International Workshop on Signal Processing Advances in Wireless Communications (SPAWC), arXiv:1711.003794v4 [eess.SP], Oct. 5, 2018, 5 pages.

*Primary Examiner* — Steven H Nguyen

(57) ABSTRACT

The disclosure relates to a communication technique and a system for combining a 5G communication system with IoT technology to support a higher data rate after a 4G system. Based on 5G communication and IoT-related technologies, the disclosure may be applied to intelligent services such as smart homes, smart buildings, smart cities, smart or connected cars, healthcare, digital education, retail, and security and safety related services. The disclosure provides a method and apparatus that enable a communication device supporting full duplex to cancel the self-interference signal in the digital domain.

12 Claims, 17 Drawing Sheets

(51) Int. Cl.
*H04L 5/14* (2006.01)
*G06N 3/02* (2006.01)
*H04L 25/02* (2006.01)
*H04B 1/12* (2006.01)

(58) Field of Classification Search
CPC ....... G06N 3/084; H04L 5/14; H04L 25/0202; H04L 25/03165; H04L 5/1423; H04L 5/1461; H04L 25/03292; H04L 25/0254
See application file for complete search history.

(56) References Cited

U.S. PATENT DOCUMENTS

| | | | |
|---|---|---|---|
| 2017/0187513 A9* | 6/2017 | Bharadia | H04B 1/56 |
| 2018/0076847 A1* | 3/2018 | Ju | H04B 1/525 |
| 2018/0278290 A1* | 9/2018 | Moorti | H04L 25/0202 |
| 2019/0181897 A1* | 6/2019 | Baek | H04B 1/04 |
| 2020/0295912 A1* | 9/2020 | Venkatraman | H04B 1/123 |
| 2021/0075464 A1* | 3/2021 | Luo | H04B 1/525 |

* cited by examiner

APPARATUS AND METHOD FOR SELF-INTERFERENCE SIGNAL CANCELLATION

CROSS-REFERENCE TO RELATED APPLICATION

This application is based on and claims priority under 35 U.S.C. § 119 to Korean Patent Application No. 10-2019-0130269, filed on Oct. 18, 2019, in the Korean Intellectual Property Office, the disclosure of which is herein incorporated by reference in its entirety.

BACKGROUND

1. Field

The disclosure relates to a method and apparatus for cancelling a digital self-interference signal and, more particularly, to a method and apparatus for cancelling a self-interference signal in the digital domain of a communication system supporting a full-duplex (FD) operation.

2. Description of Related Art

To meet the ever increasing demand for wireless data traffic since the commercial deployment of 4G communication systems, efforts have been made to develop improved 5G or pre-5G communication systems. As such, 5G or pre-5G communication systems are also called "beyond 4G network system" or "post LTE system". To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like. Additionally, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various fields, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine (M2M) or machine type communication (MTC) are being realized by use of 5G communication technologies including beamforming, MIMO, and array antennas. Application of cloud RANs as big data processing described above may be an instance of convergence of 5G technology and IoT technology.

In particular, as high-performance mobile devices are being continuously developed in recent years, there is a growing need to improve the efficiency of spectrum resources. Accordingly, various studies are being conducted to improve the bandwidth and data transmission rate. Among these, full-duplex (FD) communication is a technology that can increase the transmission rate. FD communication is a wireless communication technology that can simultaneously transmit and receive in the same frequency band. In theory, FD communication can obtain about twice the communication capacity compared to half duplex (HD) communication using the same frequency band. However, the actual communication capacity of a FD communication network cannot achieve the theoretical capacity due to the self-interference signal. Hence, research on methods for cancelling the self-interference signal has been conducted, and as a result, various techniques for cancelling self-interference signals (self-interference cancellation techniques) have been provided.

In FD communication, a self-interference cancellation technique is used to estimate and remove the self-interference signal by using information on the signal transmitted by itself. Self-interference cancellation is generally performed in the propagation domain, analog domain, and digital domain. Self-interference cancellation in the propagation domain is a technique in which the self-interference signal is received by the receive antenna in an attenuated state through antenna design or arrangement without separate signal processing. To cancel the self-interference signal in the propagation domain, different techniques are used respectively for a separate transmit/receive antenna environment and a shared transmit/receive antenna environment. For example, in the case of a separate transmit/receive antenna environment, multiple transmit antennas can be arranged to cause their self-interference signals to cancel each other at the location of the receive antenna. For example, in the case of a shared transmit/receive antenna environment, a circulator may be used to separate the transmitting end and the receiving end for self-interference cancellation. Self-interference cancellation in the analog domain is a technique for estimating and cancelling the received self-interference signal by using the analog domain transmission signal of the transmitter. Self-interference cancellation in the digital domain is a technique for estimating and cancelling the self-interference signal by using the digital signal of the transmitter.

This digital domain self-interference cancellation aims to lower the residual self-interference signal below the thermal noise level by estimating the residual self-interference signal after self-interference cancellation in the analog domain and removing the digital domain self-interference signal based on the estimated signal. However, such a related-art digital domain self-interference signal cancellation technique fails to provide an effective scheme for cancelling the digital domain self-interference signal in a time-varying channel environment.

SUMMARY

Embodiments of the disclosure provide an apparatus and method for effectively cancelling the digital domain self-interference signal even in a time-varying channel environment in a communication system supporting full-duplex (FD).

To solve the above problem, the disclosure may provide the following solutions.

According to an embodiment of the disclosure, there is provided a method for self-interference signal cancellation in a communication device supporting full duplex (FD). The method may include: identifying channel estimation information for a self-interference signal; generating input data to be used as input for estimating a nonlinear component of the self-interference signal based on a digital transmission signal associated with the self-interference signal and the channel estimation information; and estimating the nonlinear component of the self-interference signal based on the digital transmission signal and the input data, wherein estimation of the nonlinear component of the self-interference signal may be based on a preset neural network-based self-interference signal cancellation technique.

As an embodiment, generating input data may include generating the input data by multiplying the digital transmission signal and the channel estimation information together.

As an embodiment, the preset neural network-based self-interference signal cancellation technique may be a multi-layer perceptron (MLP) neural network-based self-interference signal cancellation technique.

As an embodiment, estimating the nonlinear component may be performed by a pre-trained MLP module of the communication device.

As an embodiment, the method may further include removing a linear component of the self-interference signal based on the channel estimation information.

As an embodiment, the method may further include removing the nonlinear component of the self-interference signal by subtracting the estimated nonlinear component from the self-interference signal from which the linear component has been removed.

As an embodiment, the communication device may be a communication device of a terminal or a communication device of a base station.

According to an embodiment of the disclosure, there is provided a communication device supporting full duplex (FD). The communication device may include: a transceiver; and at least one processor connected to the transceiver, wherein the at least one processor may be configured to: identify channel estimation information for a self-interference signal; generate input data to be used as input for estimating a nonlinear component of the self-interference signal based on a digital transmission signal associated with the self-interference signal and the channel estimation information; and estimate the nonlinear component of the self-interference signal based on the digital transmission signal and the input data, wherein estimation of the nonlinear component of the self-interference signal may be based on a preset neural network-based self-interference signal cancellation technique.

As an embodiment, the at least one processor may be configured to generate the input data by multiplying the digital transmission signal and the channel estimation information together.

As an embodiment, the preset neural network-based self-interference signal cancellation technique may be a multi-layer perceptron (MLP) neural network-based self-interference signal cancellation technique.

As an embodiment, estimation of the nonlinear component may be performed by a pre-trained MLP module of the communication device.

As an embodiment, the at least one processor may be configured to remove a linear component of the self-interference signal based on the channel estimation information.

As an embodiment, the at least one processor may be configured to remove the nonlinear component of the self-interference signal by subtracting the estimated nonlinear component from the self-interference signal from which the linear component has been removed.

As an embodiment, the communication device may be a communication device of a terminal or a communication device of a base station.

According to various embodiments of the disclosure, the apparatus and method for cancelling the self-interference signal in the digital domain may be applied to effectively remove the digital domain self-interference signal even in a time-varying channel environment.

Additional and various other effects of the disclosure will be described in the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
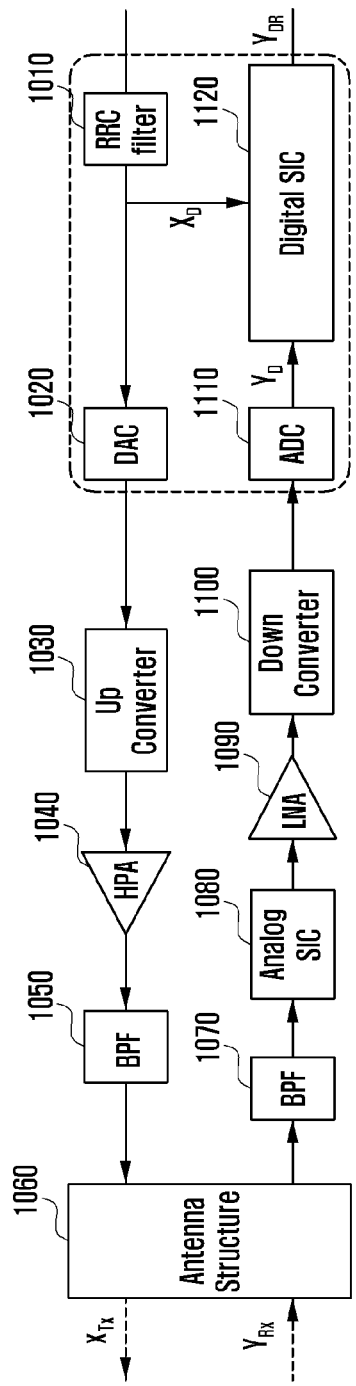
FIG. 1 illustrates the configuration of a communication device supporting FD according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to accompanying drawings.

In the following description of embodiments of the disclosure, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

In the following description, the term "base station" refers to a main agent allocating resources to terminals and may be at least one of eNode B, gNode B, Node B, radio access network (RAN), access network (AN), RAN node, radio access unit, base station controller, or network node. The term "terminal" may refer to at least one of user equipment (UE), mobile station (MS), cellular phone, smartphone, computer, or multimedia system with a communication function. In the description, the term "downlink (DL)" refers to a wireless transmission path through which the base station sends a signal to the terminal, and the term "uplink (UL)" refers to a wireless transmission path through which the terminal sends a signal to the base station. Also, it should be understood by those skilled in the art that embodiments of the disclosure are applicable to other communication systems without significant modifications departing from the scope of the disclosure.

In the following description of embodiments of the disclosure, descriptions of well-known functions and structures incorporated herein may be omitted to avoid obscuring the subject matter of the disclosure.

Next, a description is given of various embodiments of a method and apparatus for cancelling self-interference in the digital domain of a communication system supporting FD with reference to the drawings.

First, terms used in the disclosure (e.g., channel model, channel coefficient, channel estimation, etc.) are described by way of illustration.

In the disclosure, the channel model is a model representing multiple paths through which a transmitted signal reaches the receiver. This channel model reflects the attenuation and delay for each of the multiple paths, and among them, the channel coefficient may be a response coefficient of each of the multiple paths.

In the disclosure, channel estimation corresponds to a technique for finding the channel coefficients of a system including a transmitting end, a radio channel, and a receiving end by using input and output signals of the system. Channel estimation based on a least square method being a technique of channel estimation may be described as an example in the following way.

For example, the channel coefficient H of a system with M linear paths can be represented as follows.

$$\underline{H}[n] = [h_0[n], h_1[n], \ldots, h_{M-1}[n]]^T$$

If the input signal of the linear system is X, the output signal is Y, and the noise is N, the output signal Y may be represented as follows.

$$Y[n] = \sum_{i=0}^{M-1} h_i[n] X[n-i] + N[n]$$
$$= \underline{X}_M[n] \cdot \underline{H}[n] + N[n].$$

Here, $\underline{X}_M[n]$ is a matrix composed of the components of the input signal X that affect the output signal vector $Y_M[n]$ and is represented as follows.

$$Y_M[n] = [Y[n] \ Y[n+1] \ \cdots \ Y[n+K]]^T$$

$$\underline{X}_M[n] = \begin{bmatrix} X[n] & X[n-1] & \cdots & X[n-M+1] \\ X[n+1] & X[n] & \ddots & X[n-M+2] \\ \vdots & \vdots & \ddots & \vdots \\ X[n+K] & X[n+K-1] & \cdots & X[n-M+K+1] \end{bmatrix}$$

A channel estimator based on a least square method calculates the estimated channel coefficient $\hat{\underline{H}}[n]$ by using $\underline{X}_M[n]$ and $Y_M[n]$ where $$\hat{\underline{H}}[n] = ((\underline{X}_M[n])^* \cdot \underline{X}_M[n])^{-1} \cdot (\underline{X}_M[n])^* \cdot Y_M[n].$$

Here, the larger K used in the least square method, the smaller the channel estimation performance error. However, if the channel coefficient $\underline{H}[n]$ changes rapidly over time in the channel estimation period, it is difficult to accurately estimate the channel coefficient.

In the disclosure, the estimated channel coefficient is a value obtained by estimating the self-interference channel coefficient and is used in a self-interference signal estimation model. The linear estimated channel coefficient (linear channel coefficient) is a coefficient of a term corresponding to a linear component in the self-interference signal estimation model as part of the estimated channel coefficient. For example, a parallel Hammerstein model for self-interference signal estimation is given by:

$$\hat{Y}_{SI}[n] = \sum_{\substack{p=1 \\ odd}}^{P} \sum_{q=0}^{p} \sum_{m=0}^{M-1} h_{p,q,m}[n] \times (X[n-m])^q \times (X^*[n-m])^{p-q}$$

where the estimated channel coefficient means $h_{p,q,m}$ for all possible p, q and m, and the linear estimated channel coefficient means $h_{1,1,m}$ for all possible m.

FIG. 1 illustrates the configuration of a communication device supporting FD according to an embodiment of the disclosure.

According to various examples, the communication device 1000 of FIG. 1 may be a terminal or base station supporting FD, the transceiver of a terminal or base station supporting FD, or a communication module including the transceiver.

According to various examples, the communication device 1000 may include at least one element for transmitting and/or receiving a signal. For example, to transmit a signal, as shown in FIG. 1, the communication device 1000 may include a root-raised cosine (RRC) filter 1010, a digital-to-analog converter (DAC) 1020, an up converter 1030, a high power amplifier (HPA) 1040, a band-pass filter (BPF) 1050, and/or an antenna structure 1060 for signal transmission. Additionally, to receive a signal, as shown in FIG. 1, the communication device 1000 may include a BPF 1070, an analog self-interference canceller (SIC) 1080, a low noise amplifier (LNA) 1090, a down converter 1100, an analog-to-digital converter (ADC) 1110, a digital self-interference canceller (SIC) 1120, and/or an antenna structure 1060 for signal reception. Although the antenna structure for transmission and the antenna structure for reception are illustrated as a single antenna structure (e.g., shared antenna) in the embodiment of FIG. 1, without being limited thereto, they may have a separated antenna configuration according to embodiments.

According to various examples, the digital SIC 1120 may cancel the self-interference signal in the digital domain by using a preset self-interference cancellation technique. For example, the digital SIC 1120 may cancel the self-interference signal in the digital domain by using a polynomial model-based self-interference cancellation technique or a neural network-based self-interference cancellation technique.

The process for the communication device 1000 to transmit and receive signals will be described by way of example with reference to FIG. 1.

First, a description is given of the signal transmission process by way of example. The RRC filter 1010, as an example of a linear pulse shaping filter, receives a digital signal X[n] as an input signal and performs a convolution operation between the impulse response of the filter and the input signal to output a digital transmission signal $X_D$[n]. X[n] may use a binary signal with a value belonging to, for example, {1, −1}.

The DAC 1020 receives the output signal $X_D$[n] of the RRC filter as input and converts it to an analog signal (continuous time signal) $X_D$(t) for output.

The up converter 1030 is an element that raises the spectrum of a baseband signal to the passband, and may be, for example, an IQ mixer. The up converter 1030 may receive the output signal of the DAC as input and process it into a passband signal. For example, two baseband channels (signals) (e.g., I channel and Q channel) output from the DAC may be input to the up converter (e.g., IQ mixer), and, as shown in the following equation, one of the input channels may be multiplied by a sin function and the other may be multiplied by a cos function, and these two channels may be added to each other and output.

$$y(t)=\sin(2\pi f_c t+\phi)\times I_{in}(t)+\cos(2\pi f_c t+\phi)\times Q_{in}(t)$$

Here, $I_m(t)$ is the baseband input signal of the I channel, $Q_m(t)$ is the baseband input signal of the Q channel, $f_c$ is the center frequency of the passband, and $\phi$ is the phase shift occurring in the up converter.

The HPA 1040 is an example of a transmit amplifier and may serve to amplify an input signal. The HPA 1040 may receive the output signal of the up converter as input and amplify it for output. For example, the amplification gain may be constant and noise may be not present in an ideal situation. However, in the HPA, the signal is nonlinearly amplified due to the operating characteristics of the device, and amplifier noise may be added as shown in the following equation.

$$y(t)=A(x(t))x(t)+n(t)$$

The BPF 1050 is a filter that passes only a signal of a passband to be transmitted and may serve to suppress interference and noise. The BPF 1050 may receive the output signal of the HPA as an input signal, and output an output signal by performing a convolution operation between the impulse response of the filter and the input signal.

This output signal may be transmitted as a transmission signal $X_{TX}$ through the antenna structure 1060 (or, transmit antenna). For example, the antenna structure 1060 may be of a single antenna configuration using a circulator, and in this case, one antenna may be connected to the transmitting end and the receiving end at the same time. Here, the circulator may serve to prevent direct connection between the transmitting end and the receiving end. However, without being limited thereto, other types of antenna structures may be used. In the disclosure, the antenna structure may also be referred to as a transceiver.

Then, a description is given of the signal reception process by way of example. The BPF 1070 is a filter that passes only a signal corresponding to the spectrum of a desired signal to be received, and may serve to suppress interference and noise. The BPF 1070 may receive the reception signal $Y_{RX}$ received through the antenna structure 1060 (or, receive antenna) as an input signal, and output an output signal by performing a convolution operation between the filter impulse response and the input signal.

The analog self-interference canceller (SIC) 1080 may perform self-interference cancellation by using the input signal of the transmit antenna (analog transmission signal). For example, the analog SIC 1080 may receive an input signal, estimate the received self-interference signal based on the channel coefficient obtained through self-interference channel estimation and the input signal, and cancel the self-interference signal for output.

The LNA 1090 is an example of a receive amplifier and may amplify a received signal. The LNA 1090 may receive the output signal of the SIC as input, and amplify the input signal for output. Here, lower power noise may be added compared to the transmit amplifier, and amplifier noise may be added due to the operating characteristics of the device as shown in the following equation.

$$y(t)=A(x)x(t)+n(t)$$

The down converter 1100 is an element that converts a received signal of the passband spectrum into a two-channel signal of the baseband, and may receive the output signal of the LNA as input. For example, the down converter 1100 may receive the output signal of the LNA as input and separate it into two channels, and, as shown in the following equation, one channel may be multiplied by a sin function and the other channel may be multiplied by a cos function for output.

$$I_{out}(t)=h_{LPF}(t)*\{\sin(2\pi f_c t+\phi)\times x(t)\}$$

$$Q_{out}(t)=h_{LPF}(t)*\{\cos(2\pi f_c t+\phi)\times x(t)\}$$

Here, $I_{out}(t)$ is the output signal of the I channel, and $Q_{out}(t)$ is the output signal of the Q channel.

The ADC 1110 may convert the received analog signal (continuous time signal) into a digital signal (discrete time digital signal). In this process, the received signal may be sampled and quantized. For example, the ADC 1110 may receive an input signal from the down converter and output a digital signal $Y_D(t)$.

The digital SIC 1120 may use the digital transmission signal (DAC input signal) to estimate and cancel the residual self-interference signal at the SIC. The digital SIC 1120 may use the input signal of the ADC to estimate and cancel the self-interference signal for output. In this case, mainly, nonlinear components of the self-interference signal may be removed. This will be further described below.

In the transmission and reception process of the communication device described above, a certain operation may be omitted from the processes, or an additional operation may be further performed. In addition, the process may be performed in a different order from the listed order in some cases.

With reference to FIG. 1, the communication device 1000 may perform self-interference cancellation in the digital domain by using the digital SIC 1120. According to various examples, as shown in FIG. 1, the digital domain self-interference cancellation may be performed after the propagation domain self-interference cancellation and/or the analog domain self-interference cancellation are performed. Here, the propagation domain self-interference cancellation may be performed by the antenna structure (antenna ends), and the analog domain self-interference cancellation may be performed by the analog SIC 1080.

Meanwhile, the digital domain self-interference cancellation may be performed using a polynomial model-based self-interference cancellation technique or a neural network-based self-interference cancellation technique. First, a description is given of a polynomial model-based self-interference cancellation technique by way of example.

When the digital SIC 1120 performs polynomial model-based self-interference cancellation, the digital domain reception signal input to the digital SIC 1120 may be represented in the following equation as given by equation (1).

$$Y_D[n] = Y_{DSI}[n] + Y_{des}[n] + z[n] \tag{1}$$

Here, $Y_{DSI}$ indicates the digital domain self-interference signal, $Y_{des}$ indicates the desired signal, and $z$ indicates noise.

Assuming a situation where there is no noise and desired signal, the reception signal is given only by the digital domain self-interference signal $Y_{DSI}$ and can be represented as a function of the digital transmission signal as shown in Equation 2. This function is a nonlinear function and may reflect operations at the transmitting end, the receiving end, and/or the radio channel as given by equation (2).

$$Y_{DSI}[n] = f(\underline{X}_{D,M_m}) = f(X_D[n-M_r+1], \ldots, X_D[n]) \tag{2}$$

Here, $M_r$ denotes the memory length for the memory effect caused by concatenation of the transmitting end, the receiving end, and the radio channel, and $\underline{X}_{D,M_m}$ denotes those components $\{X_D[n-M_{r+1}], \ldots, X_D[n]\}$ that affects the instantaneous output $Y_{DSI}[n]$ among the digital transmission signal vector $\underline{X}_D$.

To approximate this nonlinear function $f$, a degree P polynomial model of memory length $M_m$ can be used. In this case, the approximation function $\hat{f}$ can be found by estimating the coefficients $\hat{h}_{p,m}$ from the reception signal $Y_D$ and transmission data $X_D$. On the other hand, channel estimation is generally performed in a situation where there is no desired signal $Y_{des}[n]=0$. An example of the estimation method may be the least square (LS) method. As the computational complexity is very high to estimate the coefficients $\hat{h}_{p,m}$ for all p and m at once, the coefficients $\hat{h}_{p,m}$ are estimated in sequence one by one from the lowest p. The estimated coefficients $\hat{h}_{p,m}$ are used as the coefficient of the polynomial model represented as equation (3).

$$\hat{Y}_{DSI}[n] = \hat{f}(\underline{X}_{D,M_m}) = \sum_{\substack{p=1 \\ odd}}^{p} \sum_{m=0}^{M_m-1} \hat{h}_{p,m}[n] X_D[n-m] |X_D[n-m]|^{p-1} \tag{3}$$

When the receiver cancels the self-interference signal from the reception signal, the approximation function $\hat{f}$ obtained through channel estimation is used. The receiver performs the polynomial-based self-interference cancellation technique by generating an estimate of the self-interference signal $Y_{DSI}$ from $\underline{X}D, M_s$ and cancelling it from the received digital domain signal $Y_D$. Self-interference cancellation is performed as shown in equation (4).

$$Y_{DR}[n] = Y_D[n] - \hat{Y}_{DSI}[n] = Y_{DRSI}[n] + Y_{des}[n] \tag{4}$$

In the signal $Y_{DR}[n]$ after interference cancellation, the self-interference signal $Y_{des}[n]$ and the residual interference $Y_{DRSI}[n]$ including noise may remain. If an experiment is performed with a setting $Y_{des}[n]=0$, the residual interference power can be easily measured from $Y_{DR}[n]$.

The process of self-interference cancellation of the digital SIC 1120 using a polynomial-based self-interference cancellation technique described above may be summarized as follows. First, the digital SIC 1120 estimates the coefficient $\hat{h}_{p,m}$ to be used in the polynomial model by using a least square (LS) method based on the input signal $Y_D$ and the digital transmission signal $X_D$. Next, the digital SIC 1120 calculates an estimate of the self-interference signal $\hat{Y}_{DSI}$ as in Equation 3 by using the estimated coefficient $\hat{h}_{p,m}$ and the digital transmission signal $X_D$. Finally, the digital SIC 1120 removes the estimate of the self-interference signal $\hat{Y}_{DSI}$ as in Equation 4 to output the signal $Y_{DR}$ from which the self-interference signal has been canceled. Through this process, it is possible to output a signal from which the digital domain self-interference signal has been removed.

However, in the case of a polynomial-based self-interference cancellation technique, there is a problem that the amount of computation for cancelling the self-interference signal is large and the process is complex. Therefore, a neural network-based self-interference cancellation technique is provided to solve this problem. Hereinafter, a description will be given of a neural network-based self-interference cancellation technique and embodiments of self-interference cancellation using the same with reference to the drawings. Meanwhile, each embodiment is described based on a multilayer perceptron (MLP)-based self-interference cancellation technique, which is an example of a neural network-based self-interference cancellation technique, but the scope of the disclosure is not limited thereto. In other words, the description about the following embodiments may also be applied to a neural network-based self-interference cancellation technique that performs substantially the same or similar functions as or to those of the MLP-based self-interference cancellation technique to be described below.

Figure 2:
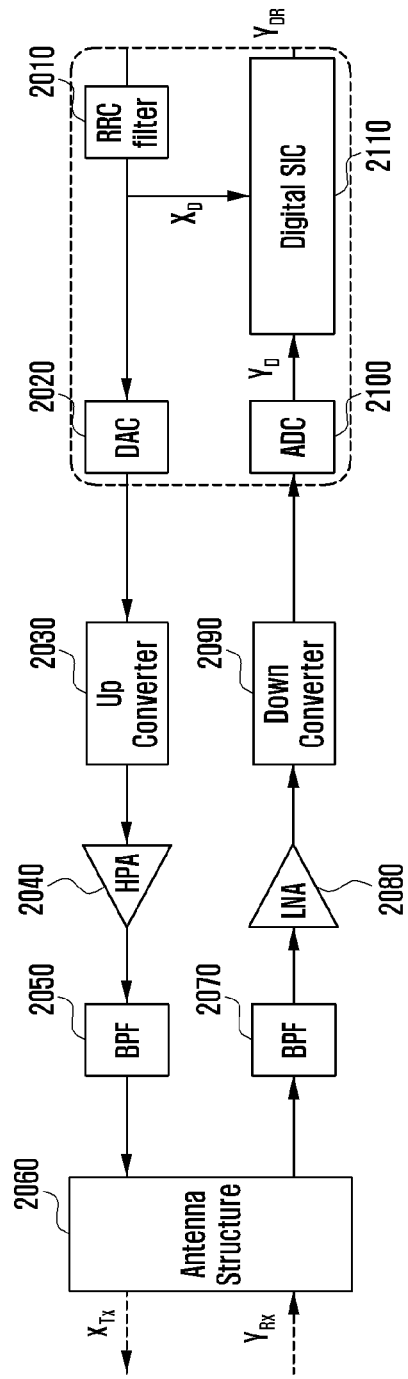
FIG. 2 illustrates the configuration of a communication device supporting FD according to another embodiment of the disclosure.

FIG. 2 illustrates the configuration of a communication device supporting FD according to another embodiment of the disclosure. For example, FIG. 2 may show an exemplary configuration of a communication device that performs a neural network-based self-interference cancellation technique.

According to various examples, the communication device 2000 of FIG. 1 may be a terminal or base station supporting FD, the transceiver of a terminal or base station supporting FD, or a communication module including the transceiver.

According to various examples, the communication device 2000 may include at least one element for transmitting and/or receiving a signal. For example, to transmit a signal, as shown in FIG. 2, the communication device 2000 may include a root-raised cosine (RRC) filter 2010, a digital-to-analog converter (DAC) 2020, an up converter 2030, a high power amplifier (HPA) 2040, a band-pass filter (BPF) 2050, and/or an antenna structure 2060 for signal transmission. Additionally, to receive a signal, as shown in FIG. 1, the communication device 2000 may include a BPF 2070, a low noise amplifier (LNA) 2080, a down converter 2090, an analog-to-digital converter (ADC) 2100, a digital SIC 2110, and/or an antenna structure 2060 for signal reception. In a certain embodiment, the communication device 2000 may have the same configuration as the communication device 1000. For example, like the communication device 1000, the communication device 2000 may further include an analog SIC. Although the antenna structure for transmission and the antenna structure for reception are illustrated as a single antenna structure (e.g., shared antenna) in the embodiment of FIG. 2, without being limited thereto, they may have a separated antenna configuration according to embodiments.

According to various examples, the digital SIC 2110 may cancel the self-interference signal in the digital domain by using a neural network-based self-interference cancellation technique. Meanwhile, in the embodiment of FIG. 2, signal transmission and reception operations of the communication device 200 through the individual components are the same as those described with reference to FIG. 1 except that the digital SIC 2110 of the communication device 2000 cancels the digital domain self-interference signal by using a neural network-based self-interference cancellation technique.

In the embodiment of FIG. 2, the digital self-interference signal input to the digital SIC 2110 may correspond to a signal on which analog interference cancellation of an appropriate level has been performed to avoid quantization noise. For example, the digital self-interference signal may be a signal to which propagation domain self-interference cancellation at the antenna end and/or analog domain self-interference cancellation have already been applied.

Figure 3A:
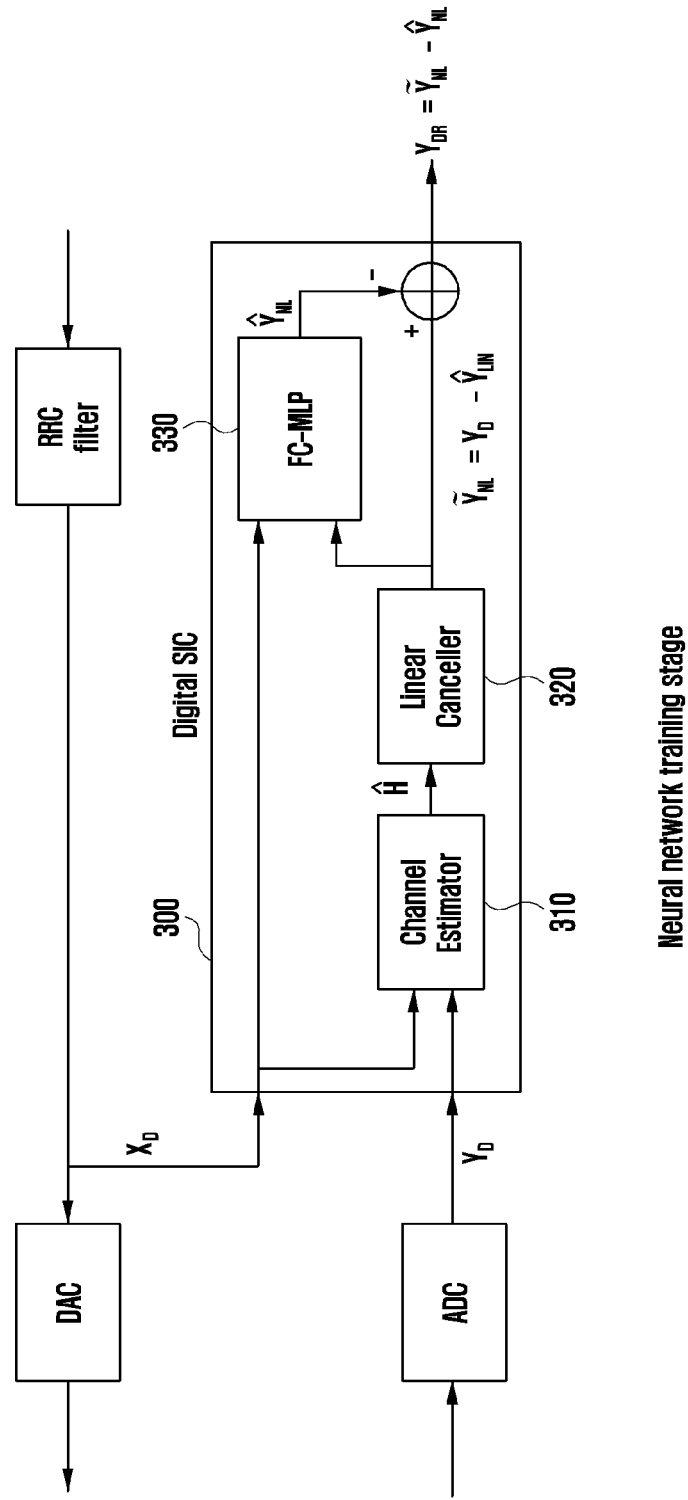
FIGS. 3A and 3B illustrate a detailed configuration of the digital SIC in the communication device of FIG. 1 or 2.
Figure 3B:
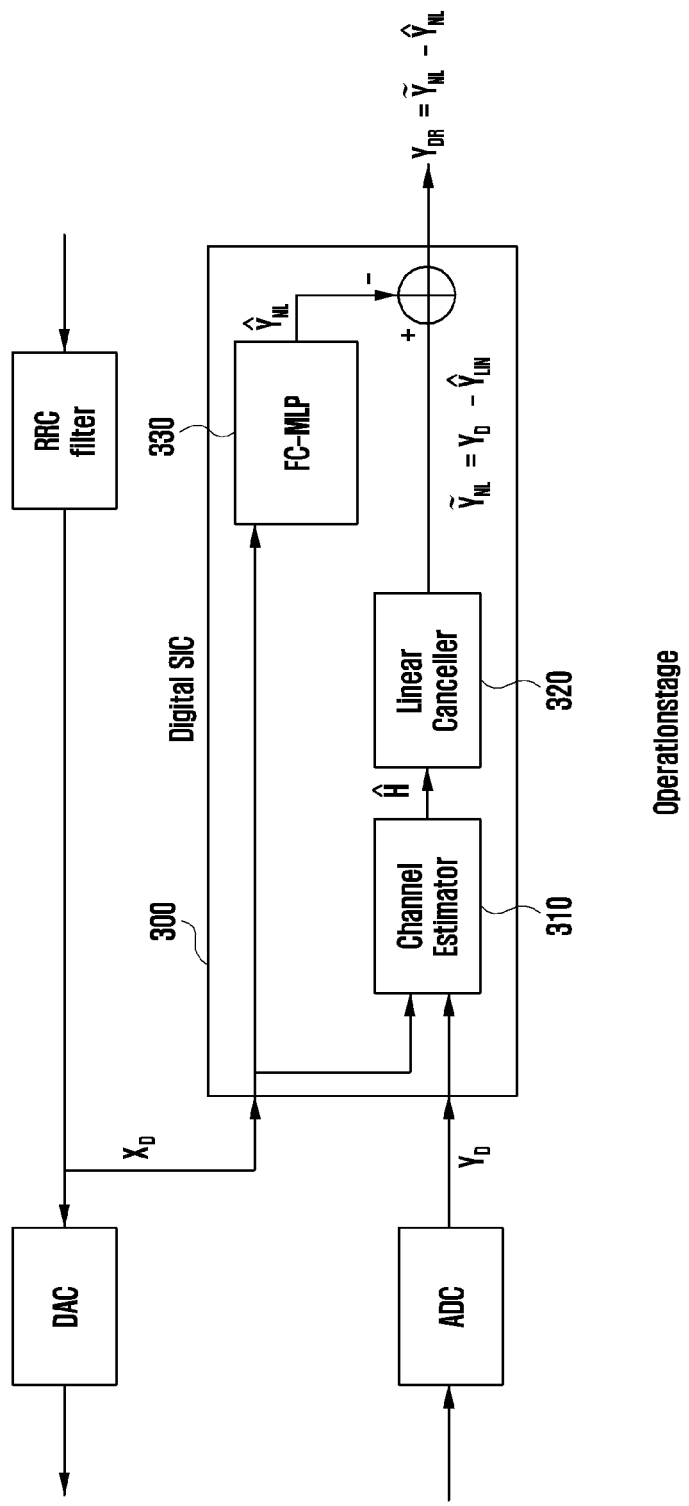

Next, a description is given of a method for the digital SIC 2110 to cancel the self-interference signal in the digital domain by using a neural network-based self-interference cancellation technique with reference to FIGS. 3A and 3B.

FIGS. 3A and 3B illustrate a detailed configuration of the digital SIC in the communication device of FIG. 1 or 2. For example, FIG. 3A shows an exemplary configuration for neural network learning of the digital SIC in the communication device of FIG. 1 or 2, and FIG. 3B shows an exemplary configuration for operations of the digital SIC in the communication device of FIG. 1 or 2.

With reference to FIGS. 3A and 3B, the digital SIC 300 may include a channel estimator 310, a linear canceller 320, and/or a multilayer perceptron (MLP) 330. In the disclosure, the MLP may be referred to as a fully connected (FC) MLP.

In the embodiment of FIGS. 3A and 3B, the digital SIC may cancel the self-interference signal in the digital domain by using an MLP-based self-interference cancellation technique. In this case, the digital SIC cannot simultaneously remove the linear component and the nonlinear component of the digital domain self-interference signal due to the characteristics of the MLP that cannot simultaneously learn two signals having significantly different power levels. Hence, the digital SIC estimates and removes the nonlinear component of the self-interference signal from which the linear component has been removed through the channel estimator and the linear canceller. That is, digital domain self-interference cancellation using an MLP-based self-interference cancellation technique may be performed by removing the linear component through the channel estimator and linear canceller and removing the nonlinear component through the MLP. This is described in detail below.

<Removing Linear Component of Self-Interference Signal Using Channel Estimator and Linear Canceller>

As described above, the linear component of the self-interference signal can be removed through the channel estimator and linear canceller. For example, removal of the linear component from the self-interference signal may be achieved through digital domain channel estimation by the channel estimator and linear component removal by the linear canceller. In the description, the channel coefficient estimated by the channel estimator may be referred to as channel estimation information, linear channel coefficient, estimated channel coefficient, self-interference channel coefficient, or the like.

According to various examples, the channel estimator may obtain the linear channel coefficient (estimated channel coefficient) $\hat{h}_i[n]$ by performing channel estimation based on a preset channel estimation method, and the linear canceller may obtain (estimate) the linear component $\hat{Y}_{LIN}[n]$ of the self-interference signal based on the linear channel coefficient and the digital transmission signal $X_D$. For example, the linear component of the self-interference signal may be obtained by equation (5) below.

$$\hat{Y}_{LIN}[n] = \sum_{i=0}^{M_m-1} \hat{h}_i[n] X_D[n-i] \qquad (5)$$

The linear canceller may obtain the nonlinear component $\tilde{Y}_{NL}$ by removing the linear component $\hat{Y}_{LIN}[n]$ from the digital domain self-interference signal $Y_D$. For example, the nonlinear component of the self-interference signal may be obtained by equation (6) below.

$$\tilde{Y}_{NL} = Y_D - \hat{Y}_{LIN} \qquad (6)$$

In the neural network training process of FIG. 3A, the output signal of the linear canceller may be used as a learning label. In addition, as in FIGS. 3A and 3B, the digital SIC can complete the removal of the interference signal in the digital domain by removing the output signal of the MLP from the output signal of the linear canceller.

<Removing Nonlinear Component of Self-Interference Signal Using MLP>

As described above, removal of the nonlinear component of the self-interference signal may be performed by the MLP. For example, the removal of the nonlinear component from the self-interference signal may be performed by learning and removing the nonlinear component of the self-interference signal through training the MLP.

According to various examples, for training the MLP, the output signal $\tilde{Y}_{NL}[n]$ of the linear canceller may be used as a learning label, and the digital transmission signal vector $\underline{X}_{D,M_m}$ may be used as input. Here, $\underline{X}_{D,M_m}$ is a portion of the digital transmission signal to be transmitted $X_D$ and may be used when estimating the digital domain self-interference signal from the digital domain reception signal $Y_D$.

For instance, in the self-interference estimation model $$\hat{Y}_D[n] = \sum_{\substack{p=1 \\ odd}}^{p} \sum_{q=0}^{p} \sum_{m=0}^{M_m-1} h_{p,q,m}[n] \times \{X_D[n-m]\}^q \times \{X_D^*[n-m]\}^{p-q}$$

where $\underline{X}_{D,M_m}$ is defined as:

$$\underline{X}_{D,M_m} = [X_D[n], X_D[n-1], \ldots, X_D[n-M_m+1]].$$

Meanwhile, the length of the vector $\underline{X}_{D,M_r}$ described above may be the same as the memory length $M_r$ due to the actual delay, and the length of $\underline{X}_{D,M_m}$ may be the same as the memory length $M_m$ considered in the self-interference estimation model.

In this case, a data set for training can be obtained through a method of collecting a nonlinear component signal (output signal of the linear canceller) obtained in sequence by operating the system in a situation where there is no desired signal and an input signal corresponding thereto.

According to various examples, training of the MLP can be performed with stochastic gradient descent (SGD) using, for example, a back propagation algorithm. Here, SGD uses a back propagation algorithm to compare the MLP and the output of the function to be trained for the same input to determine the weight update value and bias update value of the MLP. By executing SGD in an iterative manner, the MLP that operates similar to the desired function can be obtained.

The MLP trained in this way can be used for actual nonlinear interference cancellation (removing nonlinear components of the self-interference signal). For example, the MLP receives the digital transmission signal and outputs an estimate of the nonlinear component $\hat{Y}_{NL}$ of the estimated self-interference signal. In this case, the digital SIC can remove the nonlinear component of the self-interference signal by subtracting the output $\hat{Y}_{NL}$ of the MLP from the output $\tilde{Y}_{NL}$ of the linear canceller. For example, this can be represented by equation (7) below.

$$Y_{DR} = \tilde{Y}_{NL} - \hat{Y}_{NL} \qquad (7)$$

Figure 4:
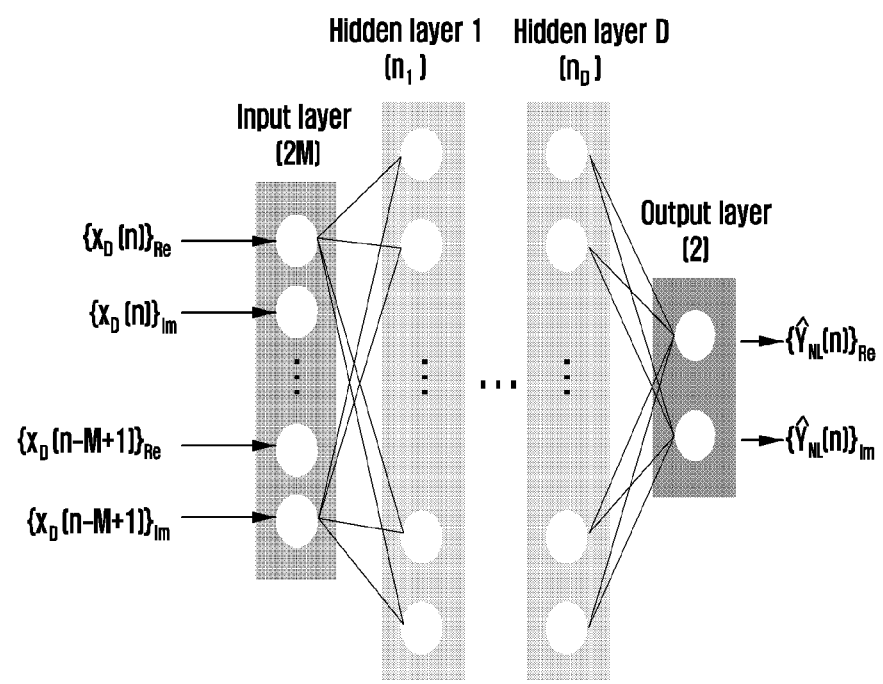
FIG. 4 illustrates the detailed configuration of an MLP in the digital SIC of FIGS. 3A and 3B.

FIG. 4 illustrates the detailed configuration of the MLP in the digital SIC of FIGS. 3A and 3B.

With reference to FIG. 4, the MLP includes an input layer, at least one hidden layer, and/or an output layer. In the embodiment of FIG. 4, the input layer may include 2M nodes. The MLP may include D hidden layers, and the $i^{th}$ hidden layer may include Ni nodes. In addition, the output layer may include 2 nodes.

As described above, the MLP having this configuration may receive the digital transmission signal as input and output the nonlinear component of the self-interference signal.

Meanwhile, the process performed by the digital SIC having the configuration illustrated in FIGS. 3A, 3B and 4 to cancel the self-interference signal by using a neural network-based self-interference cancellation technique (e.g., MLP-based self-interference cancellation technique) may be summarized as follows.

(1) Training Stage (Process)

In the training stage, the digital SIC may receive a training signal including plural frames and process the signal in units of frames.

The digital SIC may estimate the self-interference channel coefficient (linear channel coefficient) $\hat{h}_i[n]$ for each frame of the received training signal based on the digital domain reception signal (self-interference signal) $Y_D$ and the digital transmission signal $X_D$. The self-interference channel coefficient thus estimated may be used to estimate the linear component of the self-interference signal.

Next, the digital SIC may estimate (construct) the linear component $\hat{Y}_{LIN}[n]$ of the self-interference signal based on the self-interference channel coefficient and the digital transmission signal.

Next, the digital SIC may remove the linear component of the self-interference signal by removing the estimated linear component from the reception signal.

Next, the digital SIC may train the MLP by using the digital transmission signal as input and using the self-interference signal from which the linear component is removed as a learning label.

(2) Performance Test Stage (Process)

In the performance test stage, the digital SIC may receive a test signal including plural frames, process the test signal in units of frames, and then evaluate the average interference cancellation performance. On the other hand, the training stage (1) and the performance test stage (2) may be collectively referred to as MLP training stage.

The digital SIC may invoke the MLP to be used for MLP-based self-interference cancellation.

Next, the digital SIC may estimate the self-interference channel coefficient for each frame based on the digital domain reception signal $Y_D$ and the digital transmission signal $X_D$.

Next, the digital SIC may construct (estimate) and remove the linear component of the self-interference signal based on the self-interference channel coefficient.

Next, the digital SIC may estimate (construct) and remove the nonlinear component of the self-interference signal from which the linear component has been removed.

Thereby, the self-interference cancellation performance of the MLP-based self-interference cancellation technique can be identified.

(3) Operation Stage (Process)

In the operation stage, the digital SIC may receive a signal including plural frames and process the signal in units of frames. When plural frames are received, the digital SIC may perform self-interference cancellation for one frame and then determine whether to perform self-interference cancellation for the next frame.

The digital SIC may invoke the MLP to be used for MLP-based self-interference cancellation.

Next, the digital SIC may estimate the self-interference channel coefficient for the received frame based on the digital domain reception signal ° and the digital transmission signal $X_D$.

Next, the digital SIC may construct (estimate) and remove the linear component of the self-interference signal based on the self-interference channel coefficient.

Next, the digital SIC may estimate (construct) and remove the nonlinear component of the self-interference signal from which the linear component has been removed.

When the self-interference signal cancellation is completed for the received frame, the digital SIC may check whether there is another frame to be received. When there is an additional frame to be received, the digital SIC may receive the additional frame and perform the above-described operation on the received frame. When there are no more frames to be received, the digital SIC may terminate the self-interference cancellation process.

Meanwhile, when performing neural network-based self-interference cancellation (e.g., MLP-based self-interference cancellation) using the digital SIC having the configuration illustrated in FIGS. 3A, 3B and 4, only the digital transmission signal of the transmitter is input to the MLP. That is, as channel information is not input to the MLP, the trained MLP cannot respond to a channel change. Hence, when the MLP is used in a time-varying channel environment without additional training, the MLP cannot keep up with a change in the channel, so that the nonlinear component of the self-interference signal is not sufficiently removed. In addition, to address this problem, if the MLP is trained every time in a time-varying channel environment to perform self-interference cancellation, a loss occurs in computational complexity.

Therefore, hereinafter, a digital SIC of a new structure capable of robustly operating against channel changes while utilizing a neural network-based self-interference cancellation technique (e.g., MLP-based self-interference cancellation technique) will be described by way of example. When the digital SIC of this new structure is used, it is possible to perform effective self-interference cancellation even in a time-varying channel environment while maintaining the advantage of the neural network-based self-interference cancellation technique in terms of the amount of computations compared to the polynomial model-based self-interference cancellation technique.

Figure 5A:
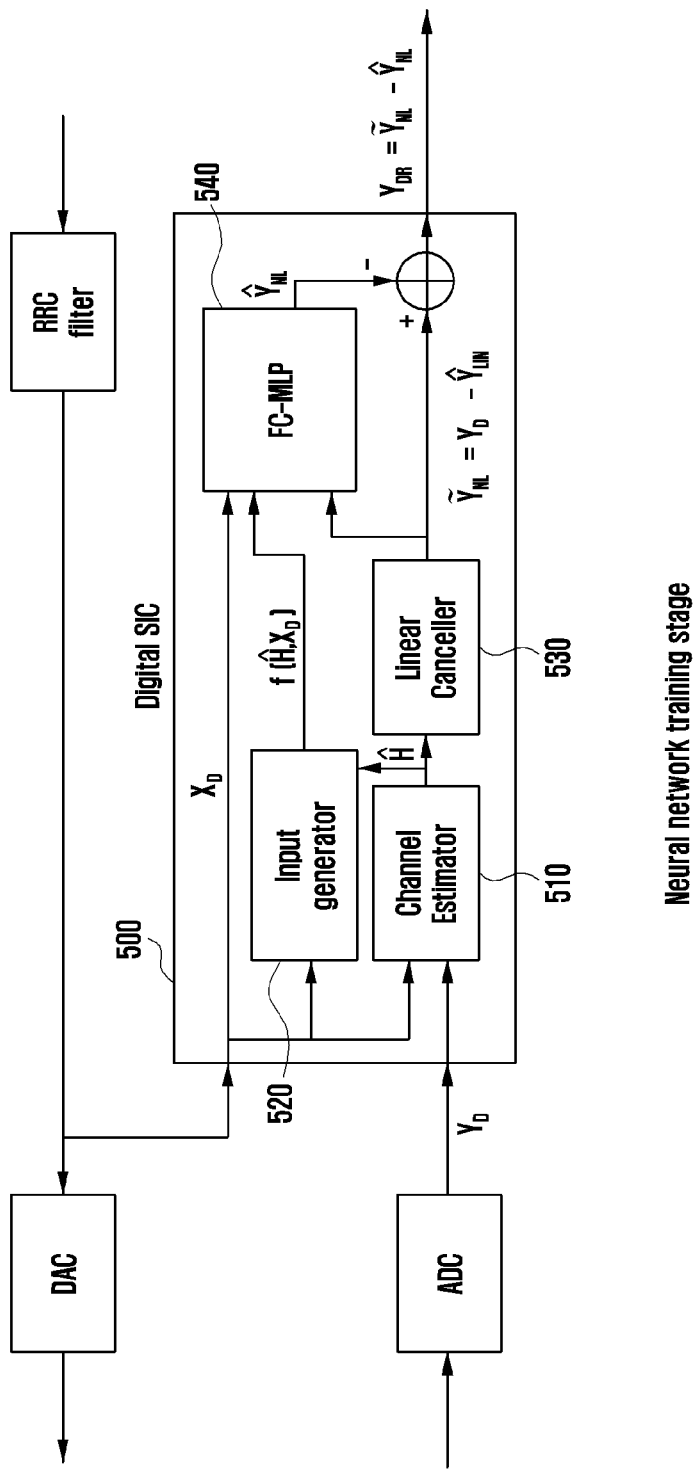
FIGS. 5A and 5B illustrate another detailed configuration of the digital SIC in the communication device of FIG. 1 or 2.
Figure 5B:
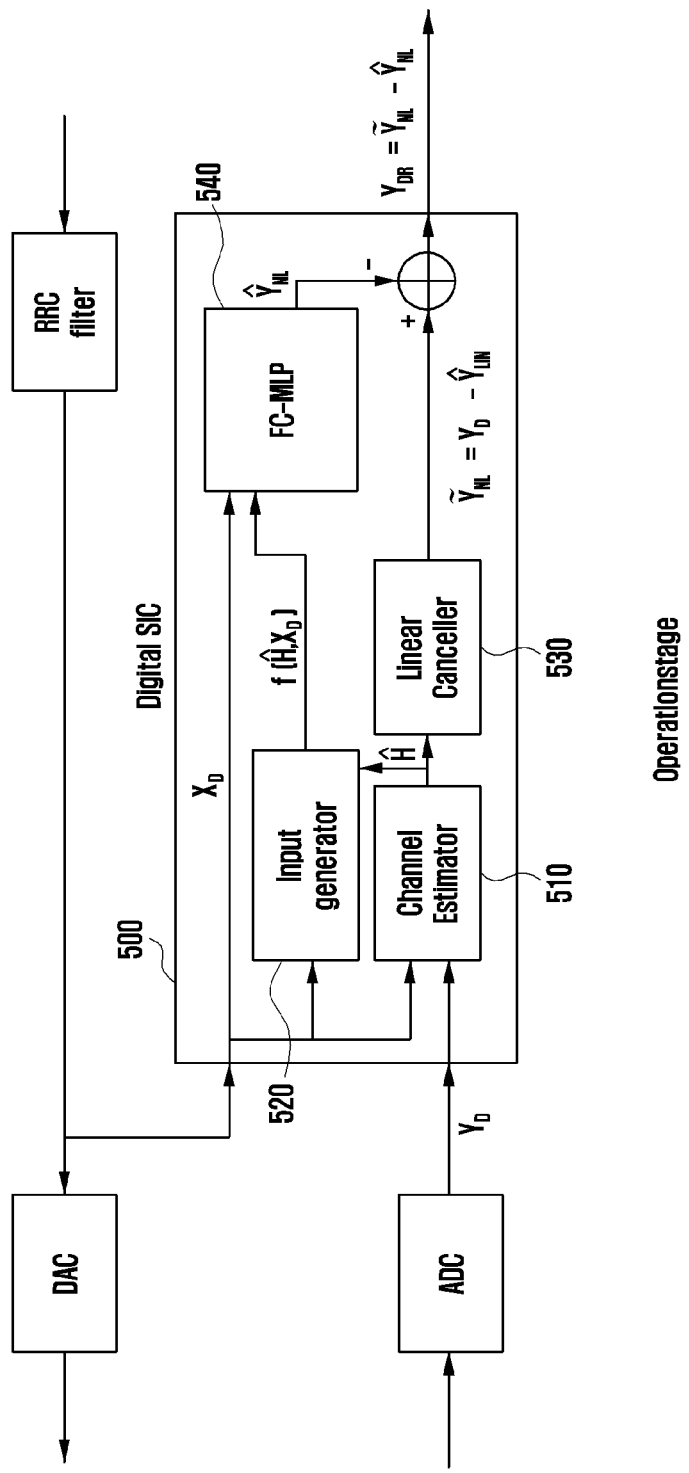

FIGS. 5A and 5B illustrate another detailed configuration of the digital SIC in the communication device of FIG. 1 or 2. For example, FIG. 5A shows another exemplary configuration of the digital SIC for neural network learning in the communication device of FIG. 1 or 2, and FIG. 5B shows another exemplary configuration of the digital SIC for operation in the communication device of FIG. 1 or 2. In FIGS. 5A and 5B, descriptions substantially identical to those described in FIGS. 3A and 3B will be omitted.

With reference to FIGS. 5A and 5B, the digital SIC 500 may include a channel estimator 510, an input generator 520, a linear canceller 530, and/or an MLP 540. In the description, the MLP may also be referred to as a fully connected (FC) MLP.

As such, in the embodiment of FIGS. 5A and 5B, unlike the embodiment of FIGS. 3A and 3B, the digital SIC may further include an input generator. In this case, the estimated channel coefficient (linear channel coefficient) output from the channel estimator can be used not only by the linear canceller but also by the input generator. The output of the input generator generated based on this channel coefficient can be input to the MLP. Thereby, the self-interference signal can be effectively removed without additional training of the MLP in a time-varying channel environment.

Next, the operation of each element will be described in detail with reference to FIGS. 5A and 5B.

<Channel Estimator>

The channel estimator may generate (obtain) the estimated channel coefficient (linear channel coefficient), which are needed by the linear canceller for removing the linear component of the self-interference signal and by the input generator for generating an input signal to the MLP.

According to various examples, the channel estimator may generate the estimated channel coefficient $\hat{H}$ based on the digital domain reception signal $Y_D$ and the digital transmission signal $X_D$. For example, the estimated channel coefficient may be represented as Equation 8 below for the maximum delay $M_m$ considered in the channel estimator.

$$\hat{H} = \{\hat{h}_0, \hat{h}_1, \ldots, \hat{h}_{M_m-1}\} \quad (8)$$

The estimated channel coefficient generated in this way may be output from the channel estimator and input to the linear canceller and the input generator.

<Linear Component Canceller>

As described above, since the MLP cannot simultaneously estimate the linear component and the nonlinear component of the self-interference signal, the linear component of the self-interference signal is removed by the linear canceller before going through the MLP.

According to various examples, the linear canceller may remove the linear component of the self-interference signal based on the estimated channel coefficient obtained by the channel estimator and the digital transmission signal. In this case, for example, the linear canceller may estimate the linear component $\hat{Y}_{LIN}$ of the self-interference signal by using equation 5 above, and obtain the self-interference signal $\tilde{Y}_{NL}$ from which the estimated linear component is removed by using equation 6 above.

In the neural network training process of FIG. 5A, the output signal of the linear canceller may be used as a learning label. In addition, as shown in FIGS. 5A and 5B, the digital SIC can complete the removal of the interference signal in the digital domain by removing the output signal of the MLP from the output signal of the linear canceller.

<Input Generator>.

The input generator may generate a signal (data) to be input to the MLP. When the estimated channel coefficient obtained through the channel estimator is input to the MLP without separate processing, as the trained MLP does not respond to a channel change, a signal to be input to the MLP needs to be generated through the input generator. The signal to be input to the MLP may be a signal including channel information (information on the self-interference channel).

According to various examples, the input generator may generate a signal to be input to the MLP based on the estimated channel coefficient output from the channel estimator and/or the digital transmission signal of the transmitter. The generated signal may be represented as Equation 9 below for example, and may be input to the MLP together with the digital transmission signal as shown in FIG. 6.

$$(\hat{H}, \underline{X}_{D,M_m}) = \{g_0, g_1, \ldots, g_{M_m-1}\} \quad (9)$$

Figure 6:
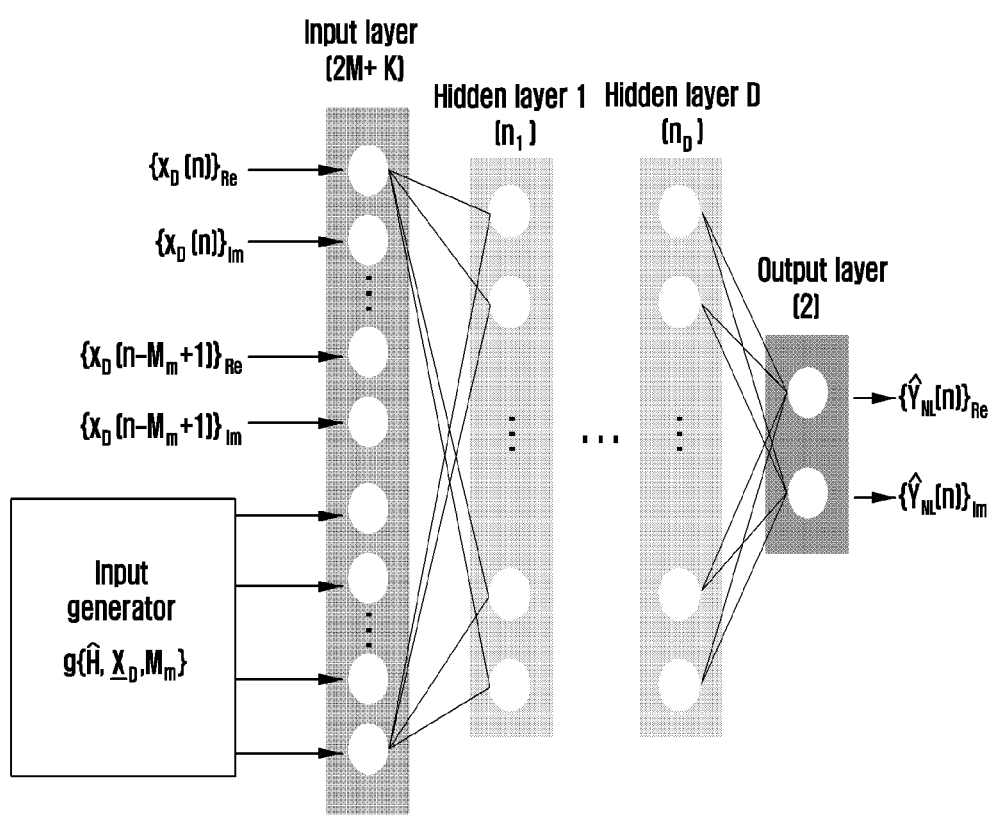
FIG. 6 illustrates a detailed configuration of the MLP in the digital SIC of FIGS. 5A and 5B.

FIG. 6 illustrates a detailed configuration of the MLP in the digital SIC of FIGS. 5A and 5B. With reference to FIG. 6, the MLP includes an input layer, at least one hidden layer, and/or an output layer.

According to various examples, the input layer may receive the digital transmission signal and a signal (e.g., K real signals) output from the input generator. The MLP may include D hidden layers, and the $i^{th}$ hidden layer may include Ni nodes. In addition, the output layer may include 2 nodes. The MLP having such a configuration may receive the digital transmission signal and the output signal of the input generator as input, and estimate and output the nonlinear component of the self-interference signal.

According to various examples, the signal to be input to the MLP may include a linear component for each path of the self-interference signal. For example, the linear component for each path of the self-interference signal may be represented as Equations 10 and 11 below, and may be input to the MLP together with the digital transmission signal as shown in FIG. 7.

$$g(\hat{H}, \underline{X}_{D,M_m}) = \{g_0, g_1, \ldots, g_{25}\} \quad (10)$$

$$g_i = \begin{cases} \left\{\hat{h}_{\lfloor\frac{i}{2}\rfloor}(n) X_D\left(n - \left\lfloor\frac{i}{2}\right\rfloor\right)\right\}_{Re}, & i \text{ is even} \\ \left\{\hat{h}_{\lfloor\frac{i}{2}\rfloor}(n) X_D\left(n - \left\lfloor\frac{i}{2}\right\rfloor\right)\right\}_{Im}, & i \text{ is odd} \end{cases} \quad (11)$$

Figure 7:
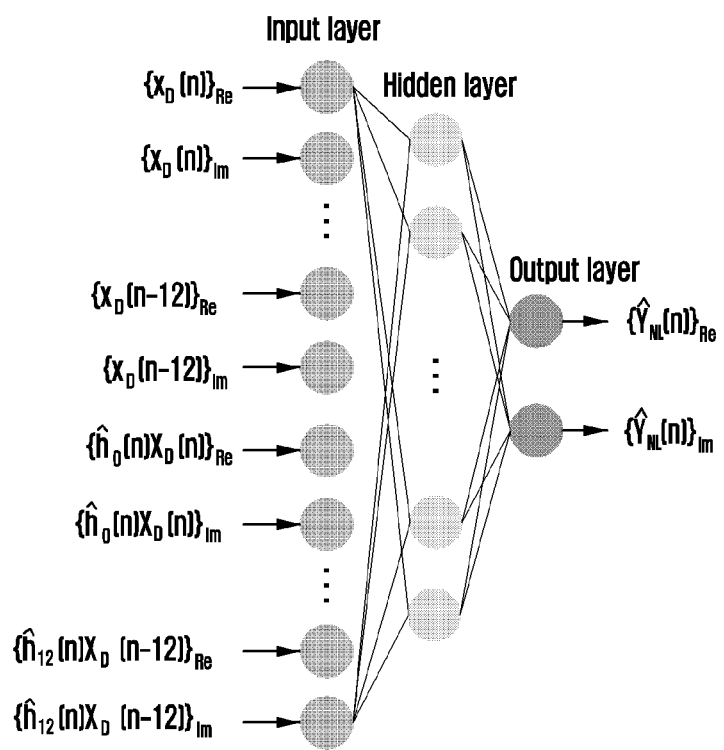
FIG. 7 illustrates another detailed configuration of the MLP in the digital SIC of FIGS. 5A and 5B.

FIG. 7 illustrates another detailed configuration of the MLP in the digital SIC of FIGS. 5A and 5B. With reference to FIG. 7, the MLP includes an input layer, a hidden layer, and/or an output layer. According to various examples, the MLP includes a single (D=1) hidden layer, and may include 52 (M=13, K=26) input layer nodes, 17 hidden layer nodes, and 2 output layer nodes. The MLP having such a configuration may receive the digital transmission signal and the output signal of the input generator as input, and estimate and output the nonlinear component of the self-interference signal.

<MLP>

As described above, the MLP may receive the digital transmission signal and the output signal of the input generator as input and estimate the nonlinear component of the self-interference signal based on the input. That is, unlike the MLP according to the embodiment of FIGS. 5A and 5B or the MLP according to the embodiment of FIGS. 3A, 3B and 4, the output signal of the input generator is further received as input. As the output signal of the input generator is generated based on the estimated channel coefficient of the channel estimator, the MLP receiving this as input may effectively remove the nonlinear component of the self-interference signal in a time-varying channel environment. When using the MLP having this configuration, compared to the use of the MLP configuration of FIGS. 3A and 3B, the MLP-based digital SIC has an advantage in that it can respond to a changing channel. In this case, it is not necessary to retrain the MLP even if the channel is changed, so there is an advantage in a time-varying channel environment in terms of computational complexity and interference cancellation performance.

According to various examples, for MLP training, the output signal $\tilde{Y}_{NL}[n]$ of the linear canceller may be used as a learning label, and in this case, the corresponding input may be $(X_{D,M_m}, g(\hat{H}, \underline{H}_{D,M_m}))$. Here, a data set may be composed by collecting received inputs in sequence when the system is operated in a situation where there is no desired signal, and the MLP may be trained with this data set for nonlinear interference cancellation (removal of nonlinear components of the self-interference signal). If training is successful, $\hat{Y}_{NL}$ output from the MLP approximates $\tilde{Y}_{NL}$ well, so that the self-interference signal can be effectively canceled.

According to various examples, the removal of the nonlinear component of the self-interference signal can be achieved by removing the output signal $\hat{Y}_{NL}$ of the MLP from the output signal $\tilde{Y}_{NL}$ of the linear canceller. The removal of the nonlinear component of the self-interference signal can be represented, for example, as in Equation 7 described above.

Figure 8A:
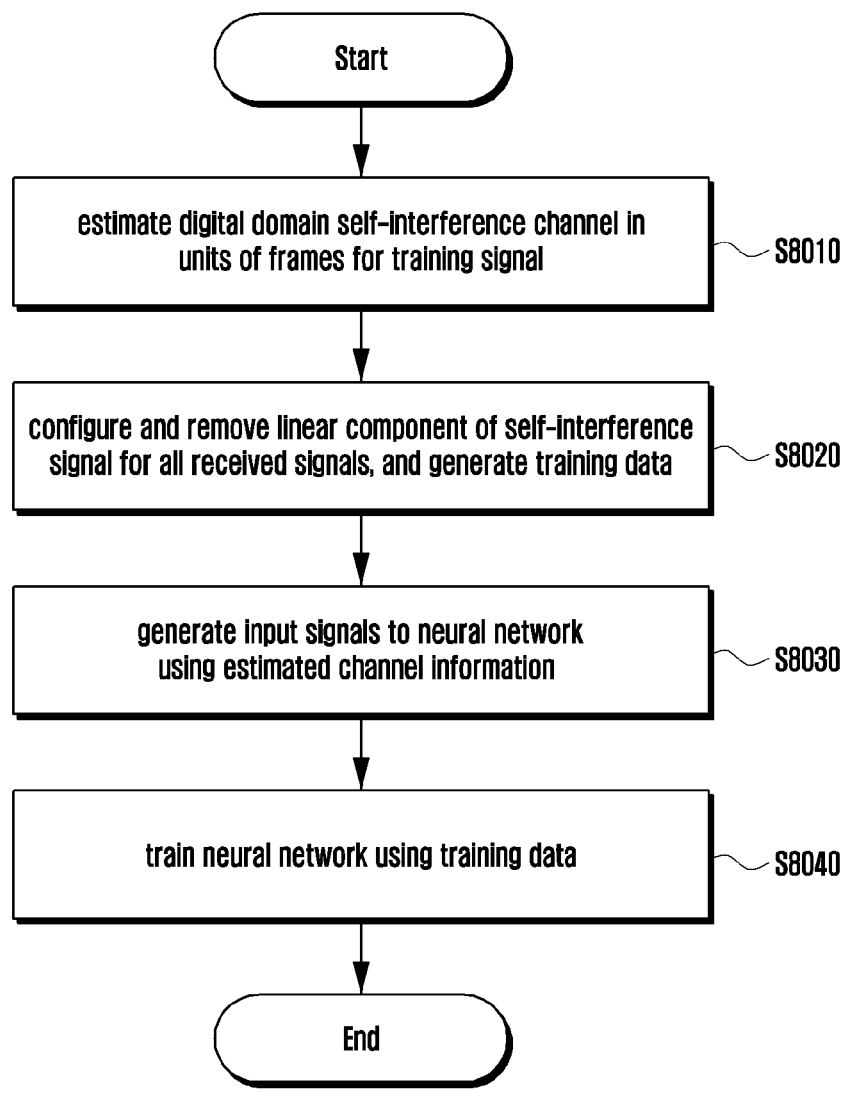
FIGS. 8A, 8B and 8C are flowcharts of a method for the digital SIC to cancel the self-interference signal by using a neural network-based self-interference cancellation technique according to an embodiment of the disclosure.
Figure 8B:
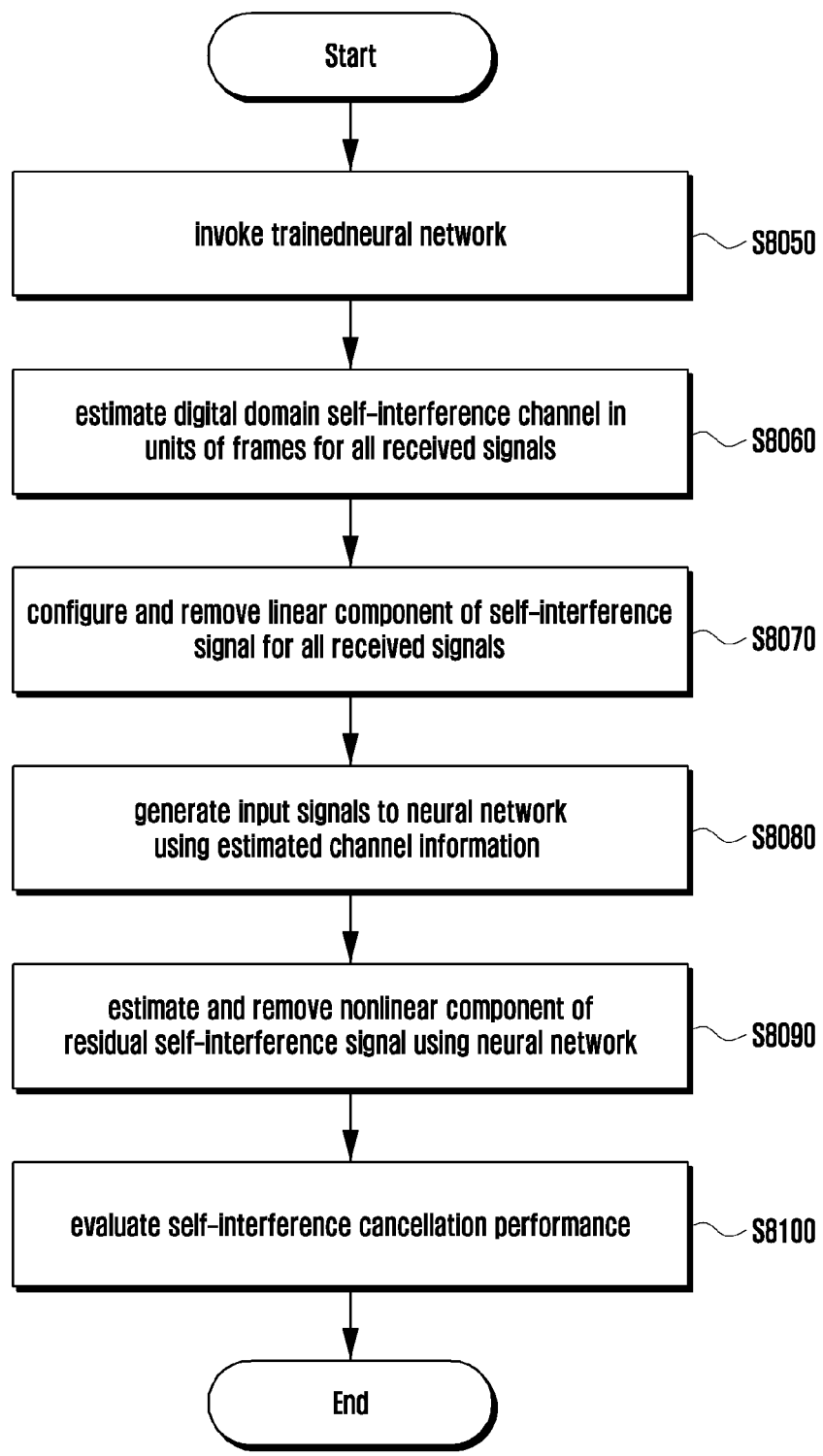
Figure 8C:
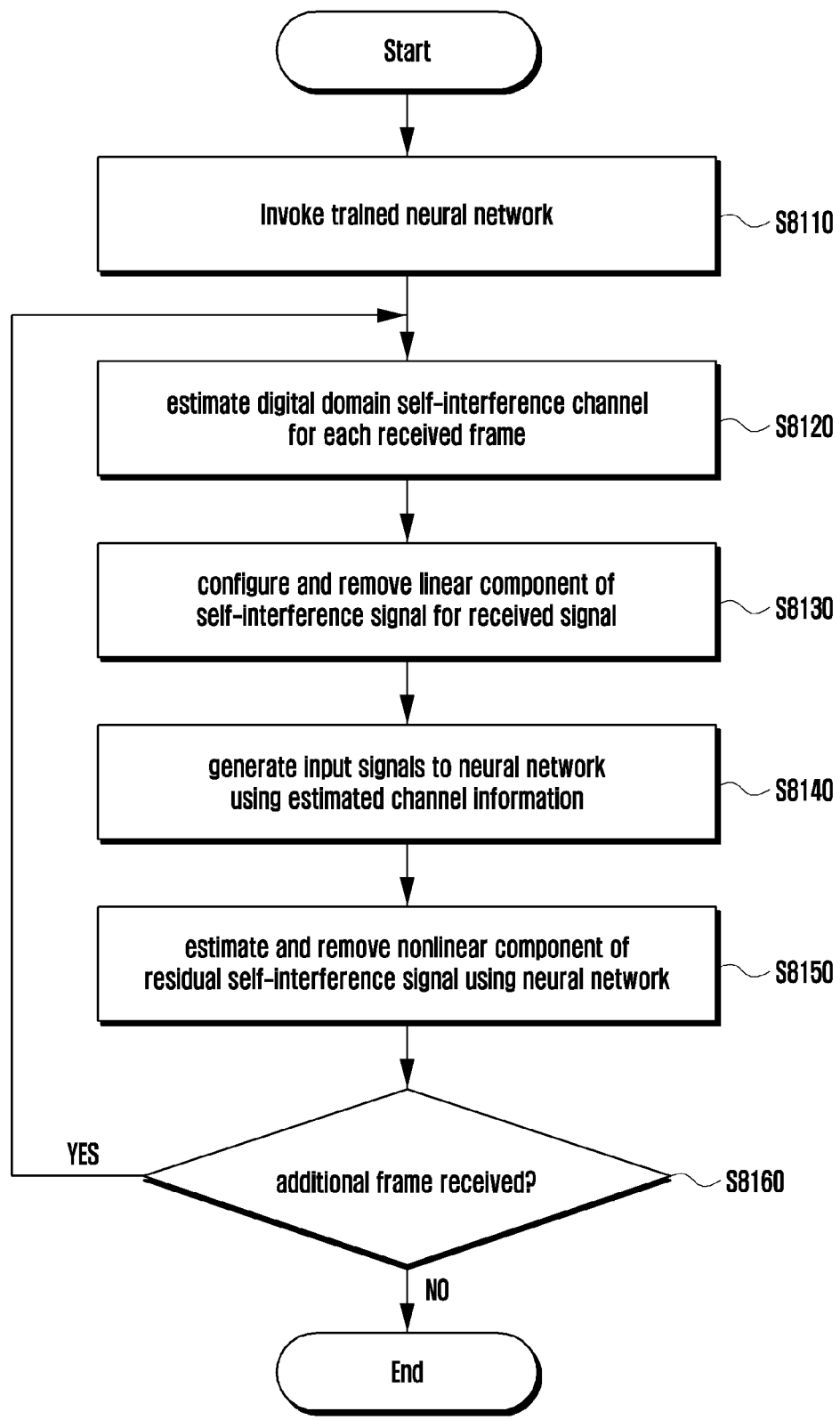

FIGS. 8A, 8B, and 8C are flowcharts of a method for the digital SIC to cancel the self-interference signal by using a neural network-based self-interference cancellation technique according to an embodiment of the disclosure. In the embodiment of FIGS. 8A, 8B, and 8C, the digital SIC may be, for example, a digital SIC having the configuration shown in FIGS. 5A to 7.

FIG. 8A is a flowchart of a training process performed by the digital SIC according to an embodiment of the disclosure.

In the training process (stage), the digital SIC may receive a training signal including plural frames and process the signal in units of frames.

At step S8010, the digital SIC may estimate the self-interference channel coefficient (linear channel coefficient) $\hat{h}_i$ for each frame of the received training signal based on the digital domain reception signal (self-interference signal) $Y_D$ and the digital transmission signal $X_D$. For example, if one frame contains 10000 symbols and 3 frames are used as a training signal, a total of 30000 received symbols and transmission signals corresponding thereto may be used to construct the training data. The estimated self-interference channel coefficient (estimated channel coefficient) may be used for estimating the linear component of the self-interference signal and generating the input signal of the MLP.

At step S8020, the digital SIC may estimate (construct) the linear component $\hat{Y}_{LIN}$ of the self-interference signal based on the self-interference channel coefficient and the digital transmitted signal, and remove the linear component of the self-interference signal by subtracting the estimated linear component from the reception signal. The self-interference signal from which the linear component has been removed $\tilde{Y}_{NL}$ may be used as a learning label for the MLP.

At step S8030, the digital SIC may generate $g(\hat{H}, \underline{X}_{D,M_m})$, which is a portion of the input data of the MLP, based on the estimated channel coefficient and the digital transmission signal.

At step S8040, the digital SIC may train the MLP by using the digital transmission signal and $g(\hat{H}, \underline{X}_{D,M_m})$ as input and using the self-interference signal from which the linear component is removed $\tilde{Y}_{NL}$ as a learning label.

FIG. 8B is a flowchart of a performance test process performed by the digital SIC according to an embodiment of the disclosure.

In the performance test stage (process), the digital SIC may receive a test signal including plural frames, process the signal in units of frames, and then evaluate the average interference cancellation performance. Meanwhile, the training stage of FIG. 8A and the performance test stage of FIG. 8B may be collectively referred to as MLP training stage.

At step S8050, the digital SIC may invoke the already trained MLP to use it in a fixed manner. For example, the digital SIC may invoke the already trained MLP for fixed use during a preset number of frames.

At step S8060, the digital SIC may estimate the self-interference channel coefficient (linear channel coefficient) for each frame of the test signal based on the digital domain reception signal $Y_D$ and the digital transmission signal $X_D$. The estimated self-interference channel coefficient (estimated channel coefficient) may be used to estimate the linear component of the self-interference signal and to generate the input signal $g(\hat{H}, \underline{X}_{D,M_m})$ of the MLP.

At step S8070, the digital SIC may estimate (construct) the linear component $\hat{Y}_{LIN}$ of the self-interference signal based on the self-interference channel coefficient and the digital transmission signal, and may remove the linear component of the self-interference signal by subtracting the estimated linear component from the reception signal.

At step S8080, the digital SIC may generate $g(\hat{H}, \underline{X}_{D,M_m})$ to be input to the MLP based on the estimated channel coefficient and the digital transmission signal.

At step S8090, the digital SIC may input the digital transmission signal and $g(\hat{H}, \underline{X}_{D,M}{}^m)$ to the MLP to estimate and remove the nonlinear component $\tilde{Y}_{NL}$ of the self-interference signal.

At step S8100, the digital SIC may evaluate the average performance of the MLP-based self-interference cancellation technique.

FIG. 8C is a flowchart of an operation process performed by the digital SIC according to an embodiment of the disclosure.

In the operation stage (process), the digital SIC may receive a signal including plural frames and process the signal in units of frames. When plural frames are received, the digital SIC may perform self-interference cancellation for one frame and then determine whether to perform self-interference cancellation for the next frame.

At step S8110, the digital SIC may invoke the MLP to be used for MLP-based self-interference cancellation. For example, the digital SIC may invoke the already trained MLP for fixed use during a preset number of frames.

At step S8120, the digital SIC may estimate the self-interference channel coefficient (linear channel coefficient) for a received frame based on the digital domain reception signal $Y_D$ and the digital transmission signal $X_D$. The estimated self-interference channel coefficient (estimated channel coefficient) may be used to estimate the linear component $\hat{Y}_{LIN}$ of the self-interference signal and to generate the input signal $g(\hat{H}, \underline{X}_{D,M_m})$ of the MLP.

At step S8130, the digital SIC may construct (estimate) and remove the linear component $\hat{Y}_{LIN}$ of the self-interference signal based on the self-interference channel coefficient.

At step S8140, the digital SIC may generate $g(\hat{H}, X_{D,M_m})$ to be input to the MLP based on the estimated channel coefficient and the digital transmission signal.

At step S8150, the digital SIC may input the digital transmission signal and $g(\hat{H}, \underline{X}_{D,M_m})$ to the MLP to estimate and remove the nonlinear component $\hat{Y}_{NL}$ of the self-interference signal.

At step S8160, the digital SIC may check whether it is desired to receive an additional frame. If it is desired to receive an additional frame, the procedure may return to step S1820. If it is not desired to receive an additional frame, the digital SIC may terminate the interference cancellation process.

As described above, when self-interference cancellation is performed according to the embodiment of FIGS. 8A, 8B and 8C, the digital SIC can effectively remove nonlinear components of the self-interference signal in a time-varying channel environment.

Figure 9:
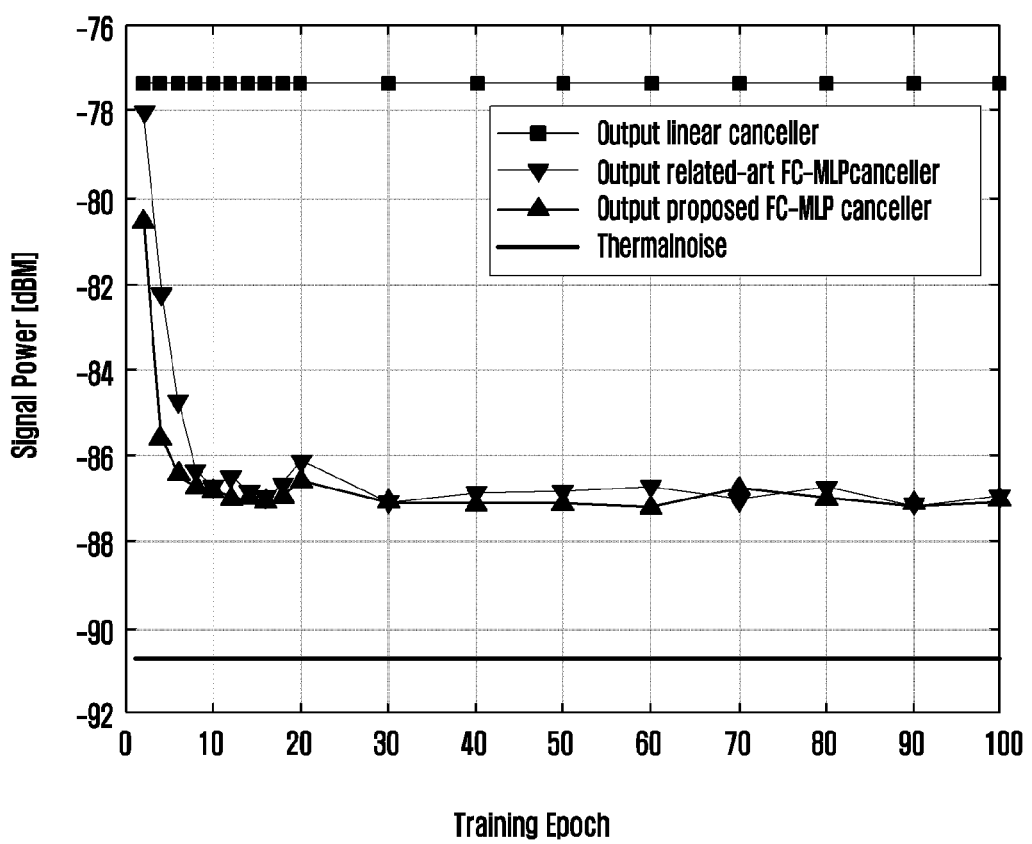
FIG. 9 is a diagram for comparing the performance of neural network-based self-interference cancellation techniques in a time-invariant channel environment.

FIG. 9 is a diagram for comparing the performance of neural network-based self-interference cancellation techniques in a time-invariant channel environment. In more detail, FIG. 9 shows a performance comparison between an embodiment (first embodiment) of a neural network-based self-interference cancellation technique for an FD communication system including a digital SIC having the configuration shown in FIGS. 3A and 3B and an embodiment (second embodiment) of a neural network-based self-interference cancellation technique for an FD communication system including a digital SIC having the configuration shown in FIGS. 5A and 5B. In the embodiment of FIG. 9, it is assumed that the MLP that has already been trained is used as it is without being retrained during the experiment for performance verification.

Table 1 below shows an example of parameters related to the communication device (FD transceiver) and the self-interference signal for the experiment of FIG. 9.

TABLE 1

| Parameters | |
|---|---|
| Transmission signal power (dBm) | 10 |
| Transmission signal center frequency (MHz) | 800 |
| Transmission signal bandwidth (MHz) | 80 |
| Transmitter amplifier noise power (dBm) | −40 |
| Modulation | QPSK |
| Type of antenna used | Shared antenna using circulator |
| Number of channel paths | 6 |
| Number of paths considered by channel estimator | 13 |
| Number of symbols per frame | 10000 |
| Sampling cycle (ns) | 12.5 |
| Digital self-interference channel estimation technique | LS method |

With reference to Table 1, the FD transceiver may employ, for example, a shared antenna using a circulator as the antenna used. However, without being limited thereto, another antenna structure may be used as the antenna used. The multipath of the self-interference channel may include, for example, 6 paths. Among the six paths, for example, as shown in Table 2, paths 1 to 3 may be internal paths of the shared antenna, and paths 4 to 6 may be external paths of the shared antenna. The channel estimator of the FD transceiver may be designed to estimate 13 paths. The channel estimation technique used in the channel estimator may be, for example, an LS method. The center frequency of the self-interference signal may be 800MH and the bandwidth thereof may be 80 MHz. The self-interference signal may be transmitted with a power of 10 dBm from the transmit antenna. The self-interference signal may be modulated with quadrature phase shift-keying (QPSK), and one frame may include 10000 symbols. The self-interference signal may be sampled in 12.5 ns units by the analog-to-digital converter (ADC) of the receiver, and one sample may be generated from one symbol.

Table 2 shows an example of a time-invariant self-interference channel model (delay and attenuation for each path) for the experiment of FIG. 9.

TABLE 2

| | Path number | | | | | |
|---|---|---|---|---|---|---|
| | 1 | 2 | 3 | 4 | 5 | 6 |
| Path type | Time-invariant path | | | | | |
| Path delay (ns) | 12.5 | 25 | 37.5 | 50 | 75 | 100 |
| Pathloss (dB) | −20 | −23 | −26 | −50 | −80 | −96 |

Table 2 shows an example of path delay and pathloss for 6 self-interference signal paths. Paths 1 to 3 are internal paths (internal self-interference signal paths) of the shared antenna based on a circulator and may have a delay of 1, 2 or 3 times the symbol period. Paths 4 to 6 are external paths (external self-interference signal paths) of the shared antenna and may have a delay of 4, 6 or 8 times the symbol period.

Table 3 shows an example of the MLP configuration in a time-invariant channel environment for the experiment of FIG. 9.

TABLE 3

| | Related-art FC-MLP parameters | Provided FC-MLP parameters |
|---|---|---|
| Number of input layer nodes | 26 | 52 |
| Number of hidden layers | 1 | 1 |
| Number of hidden layer nodes | 17 | 17 |
| Number of output layer nodes | 2 | 2 |
| Cost function | MSE | MSE |
| Activation function | ReLU | ReLU |
| Learning rate | 0.001 | 0.001 |
| Training batch size | 32 | 32 |
| Optimizer | Adam SGD optimizer | Adam SGD optimizer |
| Input data | Digital transmission signal | Digital transmission signal, Estimated linear component of self-interference signal |
| Number of training frames | 200 | 200 |
| Number of training data | 20000 | 20000 |
| Number of test frames | 100 | 100 |
| Number of test data | 10000 | 10000 |

Table 3 shows information on the MLP used for estimating the nonlinear component of the self-interference signal by way of example.

The configuration of the MLP used in the first embodiment is as follows. There are 26 nodes in the input layer, and the real part values and imaginary part values of 13 digital transmission signals are received as inputs. There is one hidden layer, which includes 17 nodes. The output layer includes 2 nodes, and each of which outputs a real part value and an imaginary part value of the nonlinear component of the self-interference signal. The cost function used in the MLP is the mean squared error (MSE), and the activation function is a rectified linear unit (ReLU).

The MLP used in the second embodiment has the same configuration as the related art MLP except for the input layer. In the MLP of the second embodiment, the input layer includes 52 nodes. The digital transmission signal is input to 26 nodes in the same manner as in the related art technique, and the signal output from the MLP input signal generator is input to the remaining 26 nodes. In the simulation, signals are input as shown in FIG. 7.

Data used for MLP training is acquired from a total of 200 frames so that the MLP is trained with various channel environments. 100 pieces of data are obtained per frame, and a total of 20,000 pieces of data are used for training. Weight update of the MLP is performed using the Adam SGD optimizer, and the training mini-batch size for this is set to 32. The learning rate is set to 0.001.

Data for performance test of the MLP-based self-interference cancellation is obtained from a total of 100 frames, so that the self-interference cancellation performance is checked for various channel environments. 100 pieces of data are obtained per frame, and a total of 10,000 pieces of data are used for testing.

From FIG. 9, for the self-interference cancellation technique of the first embodiment and the self-interference cancellation technique of the second embodiment, it is possible to identify the self-interference cancellation performance according to the number of training in an environment where the channel does not change. In an environment where the channel does not change, the output signals of the self-interference cancellers respectively using the MLP-based self-interference cancellation techniques of the first embodiment and the second embodiment both appear 3 dB above the thermal noise. As the output signal of the self-interference canceller is composed of thermal noise and residual self-interference signal, if the difference between the output signal power of the self-interference canceller and the thermal noise is within 3 dB, it can be considered that the residual self-interference signal has been reduced below the thermal noise level after the self-interference cancellation. The minimum training epoch to cancel the self-interference signal is 40, and one epoch is composed of 20000 pieces of training data.

Figure 10:
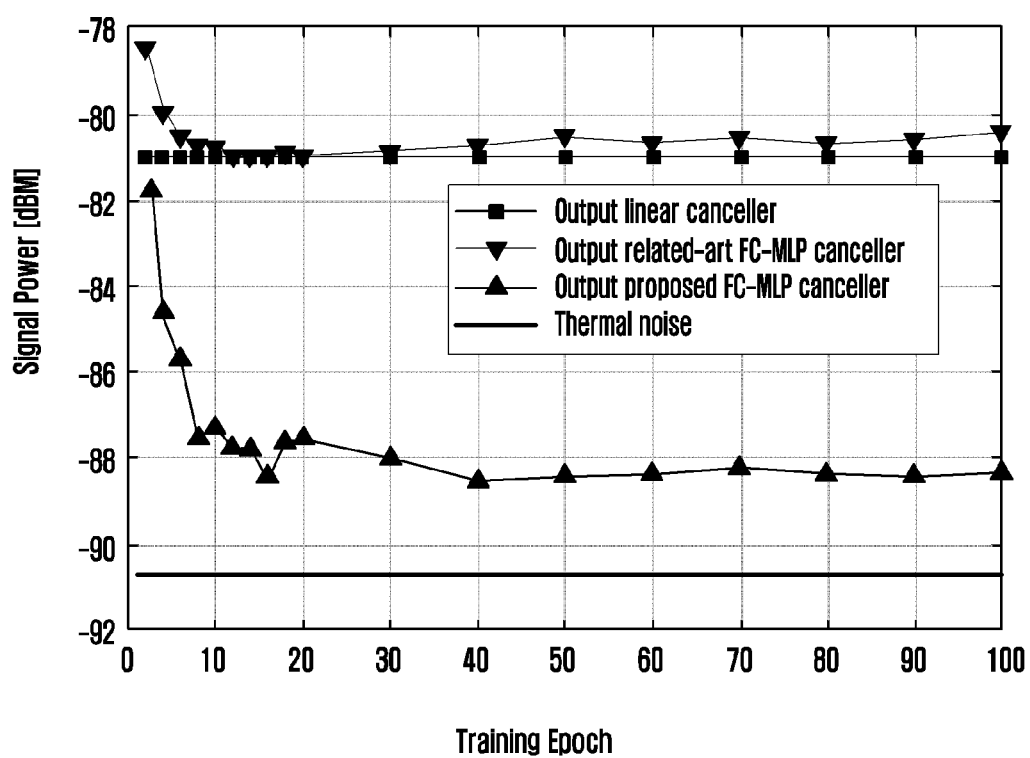
FIG. 10 is a diagram for comparing the performance of neural network-based self-interference cancellation techniques in a time-varying channel environment.

FIG. 10 is a diagram for comparing the performance of neural network-based self-interference cancellation techniques in a time-varying channel environment. In more detail, FIG. 10 shows a performance comparison between an embodiment (first embodiment) of a neural network-based self-interference cancellation technique for an FD communication system including a digital SIC having the configuration shown in FIGS. 3A and 3B and an embodiment (second embodiment) of a neural network-based self-interference cancellation technique for an FD communication system including a digital SIC having the configuration shown in FIGS. 5A and 5B. In the embodiment of FIG. 10, it is assumed that the MLP that has already been trained is used as it is without being retrained during the experiment for performance verification.

Table 4 below shows an example of parameters related to the communication device (FD transceiver) and the self-interference signal for the experiment of FIG. 10.

TABLE 4

| Parameters | |
| --- | --- |
| Transmission signal power (dBm) | 10 |
| Transmission signal center frequency (MHz) | 800 |
| Transmission signal bandwidth (MHz) | 80 |

TABLE 4-continued

| Parameters | |
| --- | --- |
| Transmitter amplifier noise power (dBm) | −40 |
| Modulation | QPSK |
| Type of antenna used | Shared antenna using circulator |
| Number of channel paths | 6 |
| Number of paths considered by channel estimator | 13 |
| Fading model | Rayleigh - Jake's model |
| Fading speed (Km/h) | 27 |
| Number of symbols per frame | 10000 |
| Sampling cycle (ns) | 12.5 |
| Digital self-interference channel estimation technique | LS method |

With reference to Table 4, the FD transceiver may employ, for example, a shared antenna using a circulator as the antenna used. However, without being limited thereto, another antenna structure may be used as the antenna used. The multipath of the self-interference channel may include, for example, 6 paths. Among the six paths, for example, as shown in Table 2, paths 1 to 3 may be internal paths of the shared antenna, and paths 4 to 6 may be external paths of the shared antenna. Here, the internal path may be a time-invariant channel, and the external path may be a time-varying channel. The time-varying channel is implemented with a Rayleigh model using the Jakes's model. The moving speed of the FD transceiver is set to 27 km/h and the Doppler frequency is set to 20 Hz. The channel estimator of the FD transceiver may be designed to estimate 13 paths. The channel estimation technique used in the channel estimator may be, for example, an LS method. The center frequency of the self-interference signal may be 800MH and the bandwidth thereof may be 80 MHz. The self-interference signal may be transmitted with a power of 10 dBm from the transmit antenna. The self-interference signal may be modulated with QPSK, and one frame may include 10000 symbols. The self-interference signal may be sampled in 12.5 ns units by the ADC of the receiver, and one sample may be generated from one symbol.

Table 5 shows an example of a time-invariant self-interference channel model (delay and attenuation for each path) for the experiment of FIG. 10.

TABLE 5

| | Path number | | | | | |
| --- | --- | --- | --- | --- | --- | --- |
| | 1 | 2 | 3 | 4 | 5 | 6 |
| Path type | Time-invariant path | | | Time-varying path | | |
| Path delay (ns) | 12.5 | 25 | 37.5 | 50 | 75 | 100 |
| Pathloss (dB) | −20 | −23 | −26 | −50 | −80 | −96 |

With reference to Table 5, paths 1 to 3 are internal self-interference signal paths of the shared antenna based on a circulator and may have a delay of 1, 2, or 3 times the symbol period, and the channel does not change. Paths 4 to 6 are external paths of the shared antenna and may have a delay of 4, 6, or 8 times the symbol period, and the channel changes over time.

Table 6 shows an example of the MLP configuration in a time-invariant channel environment for the experiment of FIG. 10.

TABLE 6

| | Related-art FC-MLP parameters | Provided FC-MLP parameters |
|---|---|---|
| Number of input layer nodes | 26 | 52 |
| Number of hidden layers | 1 | 1 |
| Number of hidden layer nodes | 17 | 17 |
| Number of output layer nodes | 2 | 2 |
| Cost function | MSE | MSE |
| Activation function | ReLU | ReLU |
| Learning rate | 0.001 | 0.001 |
| Training batch size | 32 | 32 |
| Optimizer | Adam SGD optimizer | Adam SGD optimizer |
| Input data | Digital transmission signal | Digital transmission signal, Estimated linear component of self-interference signal |
| Number of training frames | 200 | 200 |
| Number of training data | 20000 | 20000 |
| Number of test frames | 100 | 100 |
| Number of test data | 10000 | 10000 |

Table 6 shows information on the MLP used for estimating the nonlinear component of the self-interference signal by way of example.

The configuration of the MLP used in the first embodiment is as follows. There are 26 nodes in the input layer, and the real part values and imaginary part values of 13 digital transmission signals are received as inputs. There is one hidden layer, which includes 17 nodes. The output layer includes 2 nodes, and each of which outputs a real part value and an imaginary part value of the nonlinear component of the self-interference signal. The cost function used in the MLP is MSE, and the activation function is ReLU.

The MLP used in the second embodiment has the same configuration as the related art MLP except for the input layer. In the MLP of the second embodiment, the input layer includes 52 nodes. The digital transmission signal is input to 26 nodes in the same manner as in the related art technique, and the signal output from the MLP input signal generator is input to the remaining 26 nodes. In the simulation, signals are input as shown in FIG. 7.

Data used for MLP training is acquired from a total of 200 frames so that the MLP is trained with various channel environments. 100 pieces of data are obtained per frame, and a total of 20,000 pieces of data are used for training. Weight update of the MLP is performed using the Adam SGD optimizer, and the training mini-batch size for this is set to 32. The learning rate is set to 0.001.

Data for performance test of the MLP-based self-interference cancellation is obtained from a total of 100 frames, so that the self-interference cancellation performance is checked for various channel environments. 100 pieces of data are obtained per frame, and a total of 10,000 pieces of data are used for testing.

From FIG. 10, for the self-interference cancellation technique of the first embodiment and the self-interference cancellation technique of the second embodiment, it is possible to identify the self-interference cancellation performance according to the number of training in an environment where the channel changes. In an environment where the channel changes, the MLP-based self-interference cancellation technique of the first embodiment fails to remove most of the nonlinear component of the self-interference signal. The output signal of the self-interference canceller using the MLP-based self-interference cancellation techniques of the second embodiment appears 3 dB above the thermal noise. As the output signal of the self-interference canceller is composed of thermal noise and residual self-interference signal, if the difference between the output signal power of the self-interference canceller and the thermal noise is within 3 dB, it can be considered that the residual self-interference signal has been reduced below the thermal noise level after the self-interference cancellation. The minimum training epoch to cancel the self-interference signal is 40, and one epoch is composed of 20000 pieces of training data.

Figure 11:
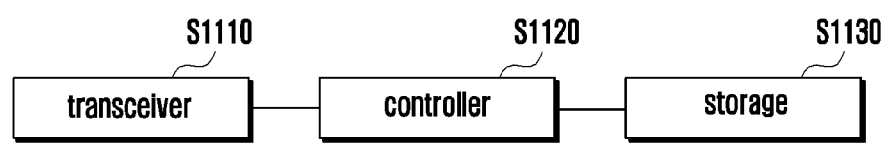
FIG. 11 is a block diagram of a terminal according to an embodiment of the disclosure.

FIG. 11 is a block diagram of a terminal according to an embodiment of the disclosure.

With reference to FIG. 11, the terminal may include a transceiver S1110, a controller S1120, and a storage S1130. In the disclosure, the controller may correspond to a circuit, an application-specific integrated circuit, or at least one processor.

The transceiver S1110 may transmit and receive signals to and from another network entity. For example, the transceiver S1110 may receive system information, synchronization signals, or reference signals from a base station.

The controller S1120 may control the overall operation of the terminal according to the embodiments provided in the disclosure. For example, the controller S1120 may control the signal flow between blocks to perform operations according to the above-described flowchart. Specifically, the controller S1120 may perform the operations provided in the disclosure to cancel the self-interference signal in an FD communication system according to an embodiment of the disclosure.

The storage S1130 may store at least one of information transmitted and received through the transceiver S1110 or information generated through the controller S1120. For example, the storage S1130 may store channel estimation information for the self-interference signal.

Figure 12:
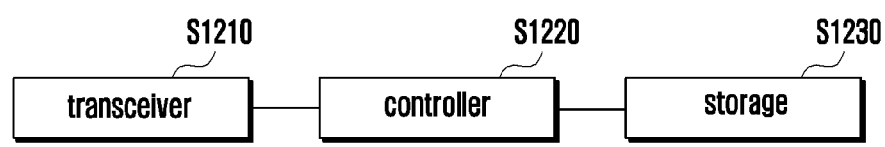
FIG. 12 is a block diagram of a base station according to an embodiment of the disclosure.

FIG. 12 is a block diagram of a base station according to an embodiment of the disclosure.

With reference to FIG. 12, the base station may include a transceiver S1210, a controller S1220, and a storage S1230. In the disclosure, the controller may correspond to a circuit, an application-specific integrated circuit, or at least one processor.

The transceiver S1210 may transmit and receive signals to and from another network entity. For example, the transceiver S1210 may transmit system information, synchronization signals, or reference signals to a terminal.

The controller S1220 may control the overall operation of the base station according to the embodiments provided in the disclosure. For example, the controller S1220 may control the signal flow between blocks to perform operations according to the above-described flowchart. Specifically, the controller S1220 may perform the operations provided in the disclosure to cancel the self-interference signal in an FD communication system according to an embodiment of the disclosure.

The storage S1230 may store at least one of information transmitted and received through the transceiver S1210 or information generated through the controller S1220. For example, the storage S1230 may store channel estimation information for the self-interference signal.

Figure 13:
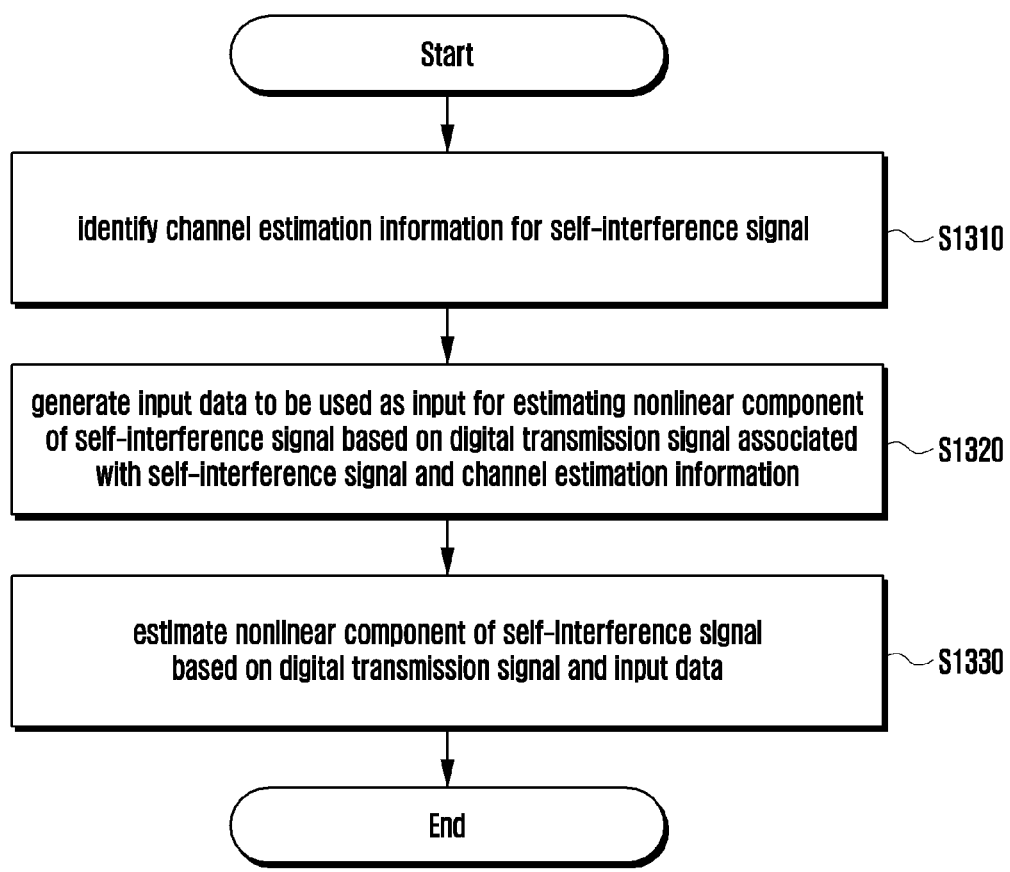
FIG. 13 is a flowchart of a method for a communication device to cancel the self-interference signal according to an embodiment of the disclosure.

FIG. 13 is a flowchart of a method for a communication device to cancel the self-interference signal according to an embodiment of the disclosure. In FIG. 13, descriptions substantially identical to those described above in FIGS. 1 to 12 will be omitted.

According to various examples, the communication device may be a terminal or base station supporting FD, the transceiver of a terminal or base station supporting FD, or a digital SIC in the transceiver or communication module including the transceiver.

With reference to FIG. 13, the communication device may identify channel estimation information for the self-interference signal (S1310). For example, the communication device may identify the channel estimation information estimated by the channel estimator as described above in FIGS. 5A and 5B.

The communication device may generate input data to be used as input for estimating the nonlinear component of the self-interference signal based on the digital transmission signal associated with the self-interference signal and channel estimation information (S1320). For example, the communication device may generate the input data by using the input generator as described above in FIGS. 5A and 5B.

The communication device may estimate the nonlinear component of the self-interference signal based on the digital transmission signal and the input data (S1330). For example, the communication device may estimate the nonlinear component of the self-interference signal by using the MLP as described above in FIGS. 5A and 5B.

According to various examples, generating input data may include generating the input data by multiplying the digital transmission signal and the channel estimation information together.

According to various examples, the preset neural network-based self-interference signal cancellation technique may be a multilayer neural network-based self-interference signal cancellation technique. According to various examples, estimating the nonlinear component may be performed by a pre-trained MLP module of the communication device.

According to various examples, the method may further include removing the linear component of the self-interference signal based on the channel estimation information. Additionally, the method may further include removing the nonlinear component of the self-interference signal by subtracting the estimated nonlinear component from the self-interference signal from which the linear component has been removed.

In the embodiments of the disclosure, the elements included in the disclosure are expressed in a singular or plural form according to the provided specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, various embodiments of the disclosure have been shown and described for the purpose of illustration without limiting the subject matter of the disclosure. It should be understood by those skilled in the art that many variations and modifications of the method and apparatus described herein will still fall within the spirit and scope of the disclosure as defined in the appended claims and their equivalents.

It should be understood that various embodiments of the disclosure and the terminology used are not intended to limit the techniques described herein to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (operatively or communicatively) "coupled with/to" or "connected with/to" another element (e.g., second element), it can be coupled or connected with/to the other element directly or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit of a single-bodied component or a part thereof. The module may be the minimum unit, or a part thereof, which performs one or more particular functions. For example, a module may be implemented in the form of an application-specific integrated circuit (ASIC).

Various embodiments of the disclosure may be implemented in software (e.g., programs) including instructions stored in a machine-readable storage medium (e.g., internal memory or external memory) readable by a machine (e.g., computer). The machine is a device that can fetch a stored instruction from a storage medium and operate according to the fetched instruction, and may include a terminal in accordance with the various embodiments. When the instruction is executed by a processor, the processor may perform the function corresponding to the instruction directly or using other components under control. The instructions may include a code generated by a compiler or a code executable by an interpreter.

The machine-readable storage medium may be provided in the form of a non-transitory storage medium. Here, "non-transitory" means that the storage medium does not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online through an application store (e.g., PlayStore™). For on-line distribution, at least a portion of the computer program product may be temporarily stored or temporarily created in a storage medium such as a memory of a manufacturer's server, an application store's server, or a relay server. Each of the components (e.g., modules or programs) according to various embodiments may be composed of one or more elements. An existing component may be omitted, and a new component may be added. Alternatively or additionally, some of the components (e.g., modules or programs) may be combined into one entity while maintaining the same functionality. Operations supported by a module, program, or another component in an embodiment may be carried out in sequence, in parallel, by repetition, or heuristically. Some operations may be executed in a different order or may be omitted, and a new operation may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a communication device for self-interference signal cancellation supporting a full duplex (FD) operation, the method comprising:
   identifying channel estimation information for a self-interference signal;
   generating input data for estimating a nonlinear component of the self-interference signal based on a digital transmission signal associated with the self-interference signal and the channel estimation information, the input data representing a linear component for each path of the self-interference signal; and
   estimating the nonlinear component of the self-interference signal with a preset neural network-based self-interference signal cancelation technique, using the digital transmission signal and the input data as inputs by a pre-trained fully connected multilayer perceptron (FC-MLP) module including an output layer,
   wherein the output layer includes 2 nodes, which output a real part value and an imaginary part value, respectively, of the nonlinear component of the self-interference signal.

2. The method of claim 1, wherein the generating input data comprises generating the input data by multiplying the digital transmission signal and the channel estimation information.

3. The method of claim 1, wherein the preset neural network-based self-interference signal cancellation technique is a multilayer neural network-based self-interference signal cancellation technique.

4. The method of claim 1, further comprising removing a linear component of the self-interference signal based on the channel estimation information.

5. The method of claim 4, further comprising removing the nonlinear component of the self-interference signal by subtracting the estimated nonlinear component from the self-interference signal from which the linear component has been removed.

6. The method of claim 1, wherein the communication device is a communication device of a terminal or a communication device of a base station.

7. A communication device supporting a full duplex (FD) operation, comprising:
   a transceiver; and
   at least one processor connected to the transceiver,
   wherein the at least one processor is configured to:
      identify channel estimation information for a self-interference signal;
      generate input data for estimating a nonlinear component of the self-interference signal based on a digital transmission signal associated with the self-interference signal and the channel estimation information, the input data representing a linear component for each path of the self-interference signal; and
      estimate the nonlinear component of the self-interference signal with a preset neural network-based self-interference signal cancelation technique, using the digital transmission signal and the input data as inputs by a pre-trained fully connected multilayer perceptron (FC-MLP) module including an output layer,
   wherein the output layer includes 2 nodes, which output a real part value and an imaginary part value, respectively, of the nonlinear component of the self-interference signal.

8. The communication device of claim 7, wherein the at least one processor is configured to generate the input data by multiplying the digital transmission signal and the channel estimation information.

9. The communication device of claim 7, wherein the preset neural network-based self-interference signal cancellation technique is a multilayer neural network-based self-interference signal cancellation technique.

10. The communication device of claim 7, wherein the at least one processor is further configured to remove a linear component of the self-interference signal based on the channel estimation information.

11. The communication device of claim 10, wherein the at least one processor is further configured to remove the nonlinear component of the self-interference signal by subtracting the estimated nonlinear component from the self-interference signal from which the linear component has been removed.

12. The communication device of claim 7, wherein the communication device is a communication device of a terminal or a communication device of a base station.

* * * * *